United States Patent
Yang et al.

(10) Patent No.: US 10,314,065 B2
(45) Date of Patent: Jun. 4, 2019

(54) TRAFFIC MULTIPLEXING

(71) Applicant: QUALCOMM Incorporated, San Diego, CA (US)

(72) Inventors: Yang Yang, San Diego, CA (US); Jing Jiang, San Diego, CA (US); Peter Ang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 15/474,503

(22) Filed: Mar. 30, 2017

(65) Prior Publication Data
US 2017/0295592 A1    Oct. 12, 2017

Related U.S. Application Data

(60) Provisional application No. 62/321,669, filed on Apr. 12, 2016.

(51) Int. Cl.
| | |
|---|---|
| *H04L 1/00* | (2006.01) |
| *H04W 72/04* | (2009.01) |
| *H04W 72/12* | (2009.01) |
| *H04W 88/06* | (2009.01) |

(52) U.S. Cl.
CPC ........... *H04W 72/1263* (2013.01); *H04L 1/00* (2013.01); *H04W 72/0446* (2013.01); *H04W 72/1215* (2013.01); *H04W 72/1242* (2013.01); *H04W 88/06* (2013.01)

(58) Field of Classification Search
CPC ........... H04W 72/042; H04W 72/0446; H04W 72/1242; H04W 72/1289; H04L 5/0053
See application file for complete search history.

(56) References Cited

U.S. PATENT DOCUMENTS

| | | | |
|---|---|---|---|
| 2014/0293912 A1 | 10/2014 | Chao et al. | |
| 2017/0201968 A1* | 7/2017 | Nam | H04W 4/70 |
| 2017/0230994 A1* | 8/2017 | You | H04W 72/042 |
| 2017/0285130 A1* | 10/2017 | Kim | H04L 1/00 |

OTHER PUBLICATIONS

"5G Views on Technology & Standardization", 3GPP Draft, RWS-150012, QCOM-5G, 3rd Generation Partnership Project (3GPP), Mobile Competence Centre, 650, Route Des Lucioles, F-06921, Sophia, Antipolis Cedex, France, Sep. 2, 2015 (Sep. 2, 2015), XP051043597, Retrieved from the Internet: URL:http://www.3gpp.org/ftp/Meetings_3GPP_SYNC/WORKSHOP/Docs/.
International Search Report and Written Opinion—PCT/US2017/026003—ISA/EPO—dated Aug. 3, 2017.

* cited by examiner

*Primary Examiner* — Jung H Park
(74) *Attorney, Agent, or Firm* — Loza & Loza LLP

(57) ABSTRACT

The disclosure relates in some aspects to multiplexing different types of traffic. Techniques are disclosed to facilitate puncturing one type of traffic with another type of traffic (e.g., traffic having more stringent latency and/or reliability requirements). In some aspects, these techniques mitigate potential loss of control information for the punctured traffic. In some aspects, the disclosed techniques are applicable to mobile broadband traffic and mission critical traffic.

22 Claims, 22 Drawing Sheets

TRAFFIC MULTIPLEXING

CROSS-REFERENCE TO RELATED APPLICATION(S)

This application claims priority to and the benefit of provisional patent application No. 62/321,669 filed in the U.S. Patent and Trademark Office on Apr. 12, 2016, the entire content of which is incorporated herein by reference.

INTRODUCTION

Various aspects of the present disclosure relate generally to wireless communication and, more particularly but not exclusively, to multiplexing different types of wireless communication traffic.

Wireless communication networks provide various communication services such as telephony, video, data, messaging, broadcasts, and so on. Such networks, which are usually multiple access networks, support communications for multiple users by sharing the available network resources.

In practice, different users may communicate different types of traffic with different quality of service (QoS) goals. For example, some types of traffic may be deemed important traffic in that the QoS for the traffic may specify low latency, high reliability, high priority, or a combination thereof. Scheduling issues can arise in meeting these QoS goals when these types of important traffic are carried over a resource that also carries other types of traffic. Therefore, there a need for multiple access techniques that effectively support traffic associated with low latency, high reliability, high priority, or other characteristics that are deemed important.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: schedule control signaling of first traffic on a first set of resource elements and data of the first traffic on a second set of resource elements, wherein at least a portion of the first set of resource elements is protected from additional scheduling; schedule second traffic on the second set of resource elements; and communicate a schedule indicative of the scheduling of the first traffic and the second traffic.

Another aspect of the disclosure provides a method of communication including: scheduling control signaling of first traffic on a first set of resource elements and data of the first traffic on a second set of resource elements, wherein at least a portion of the first set of resource elements is protected from additional scheduling; scheduling second traffic on the second set of resource elements; and communicating a schedule indicative of the scheduling of the first traffic and the second traffic.

Another aspect of the disclosure provides an apparatus configured for communication. The apparatus including: means for scheduling control signaling of first traffic on a first set of resource elements and data of the first traffic on a second set of resource elements, wherein at least a portion of the first set of resource elements is protected from additional scheduling; means for scheduling second traffic on the second set of resource elements; and means for communicating a schedule indicative of the scheduling of the first traffic and the second traffic.

Another aspect of the disclosure provides a non-transitory computer-readable medium storing computer-executable code, including code to: schedule control signaling of first traffic on a first set of resource elements and data of the first traffic on a second set of resource elements, wherein at least a portion of the first set of resource elements is protected from additional scheduling; schedule second traffic on the second set of resource elements; and communicate a schedule indicative of the scheduling of the first traffic and the second traffic.

In one aspect, the disclosure provides an apparatus configured for communication that includes a memory and a processor coupled to the memory. The processor and the memory are configured to: receive information according to a schedule for first traffic, wherein at least a portion of a first set of resource elements scheduled for the first traffic is protected from additional scheduling; and determine, based on the received information, whether second traffic punctured at least one second resource element for the first traffic.

Another aspect of the disclosure provides a method of communication including: receiving information according to a schedule for first traffic, wherein at least a portion of a first set of resource elements scheduled for the first traffic is protected from additional scheduling; and determining, based on the received information, whether second traffic punctured at least one second resource element for the first traffic.

Another aspect of the disclosure provides an apparatus configured for communication. The apparatus including: means for receiving information according to a schedule for first traffic, wherein at least a portion of a first set of resource elements scheduled for the first traffic is protected from additional scheduling; and means for determining, based on the received information, whether second traffic punctured at least one second resource element for the first traffic.

Another aspect of the disclosure provides a non-transitory computer-readable medium storing computer-executable code, including code to: receive information according to a schedule for first traffic, wherein at least a portion of a first set of resource elements scheduled for the first traffic is protected from additional scheduling; and determine, based on the received information, whether second traffic punctured at least one second resource element for the first traffic.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
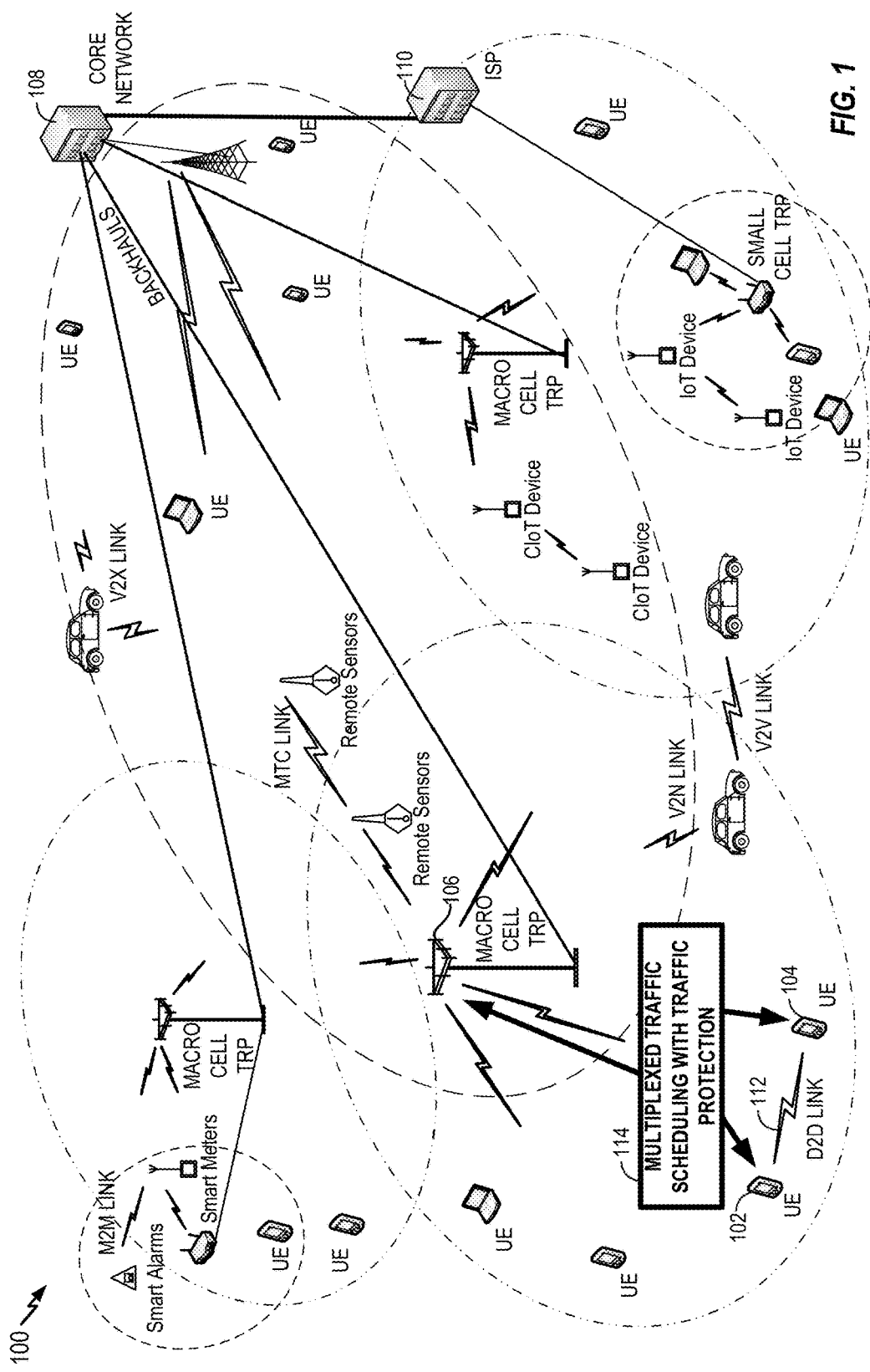
FIG. 1 is a diagram illustrating an example of a wireless communication system within which aspects of the disclosure may find application.

The disclosure relates in some aspects to managing the multiplexing of different types of traffic to mitigate collisions that could otherwise occur as a result of the multiplexing. In some aspects, the disclosure relates to multiplexing mission critical (MiCr) data with enhanced mobile broadband (eMBB) control signaling and/or nominal control signaling. For example, collisions to control signaling may be mitigated by prohibiting puncturing by one type of traffic (e.g., higher priority traffic) in a control region of a TTI scheduled for another type of traffic (e.g., lower priority traffic). As another example, collisions to control signaling may be mitigated by defining a puncture-free region in a control region of a TTI scheduled for lower priority traffic. As yet another example, collisions to control signaling may be mitigated by defining an indicator channel for a control region of a TTI scheduled for lower priority traffic, where the indicator channel points to a later control region.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, fifth generation (5G) technology, fourth generation (4G) technology, third generation (3G)

technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other UEs via wireless communication signaling. For example, a first UE 102 and a second UE 104 may communicate with a transmit receive point (TRP) 106 using wireless communication resources managed by the TRP 106 and/or other network components (e.g., a core network 108, an internet service provider (ISP) 110, and so on). In some implementations, one or more of the components of the system 100 may communicate with each other directedly via a device-to-device (D2D) link 112 or some other similar type of direct link.

In accordance with the teachings herein, communication in the wireless communication system 100 may involve sharing a common set of resources between different types of traffic. For example, the TRP 106 may initially schedule a first type of traffic on a set of resource elements. Subsequently, the TRP 106 may schedule a second type of traffic (e.g., having higher priority than the first type of traffic) on the same set of resource elements. In some cases (e.g., to meet a latency or throughput goal), the second type of traffic may need to puncture some of the resource elements previously scheduled for the first type of traffic. However, some of the resource elements may carry information for the first traffic that should not be punctured. To this end, the TRP 106 may protect some of the resource elements scheduled for the first type of traffic from additional scheduling (e.g., protect these resource elements from being punctured). Accordingly, each of the UE 102, the UE 104, and the TRP 106 may include functionality for multiplexed traffic scheduling with traffic protection 114 for enabling certain traffic to puncture other traffic, while protecting some of the other traffic from puncture.

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, and vehicle-to-anything (V2X) links. Network-to-device links may include, without limitation, uplinks (or reverse links), downlinks (or forward links), and vehicle-to-network (V2N) links.

Mission Critical Services

Some services, such as mission critical (MiCr) services, have relatively stringent latency and reliability requirements. In some aspects, these requirements may dictate that the transmission time interval (TTI) used for MiCr be relatively small, as compared to the TTI used for enhanced mobile broadband (eMBB) traffic and/or the TTI used for nominal traffic. In addition, in some aspects, these requirements may dictate that MiCr data takes higher priority as compared to eMBB data and/or nominal data. Therefore, to support MiCr traffic multiplexed with eMBB traffic and/or nominal traffic over a particular resource, MiCr data may be allowed to "puncture" within the eMBB TTI and/or the nominal TTI.

If MiCr data punctures eMBB data and/or nominal data, the eMBB data and/or nominal data may still be recovered (e.g., by using a MAC-layer forward error correction code). However, if MiCr data punctures the eMBB control signaling and/or the nominal control signaling, this may cause a relatively large loss of eMBB traffic efficiency and/or nominal traffic efficiency. For example, at a user equipment (UE) that receives punctured traffic, the loss of the control information could lead to the loss of the entire eMBB data and/or nominal data.

Mission Critical (MiCr) communication is also known as Ultra Reliable Low Latency Communication (URLLC). Thus, the two terms may be used interchangeably herein.

The term TTI generally refers to a period of time designated for communication. Thus, terms such as TTI, subframe, and slot can be used interchangeably (e.g., as long as it includes a control region).

Managing Co-Existence Traffic Multiplexing

Figure 2:
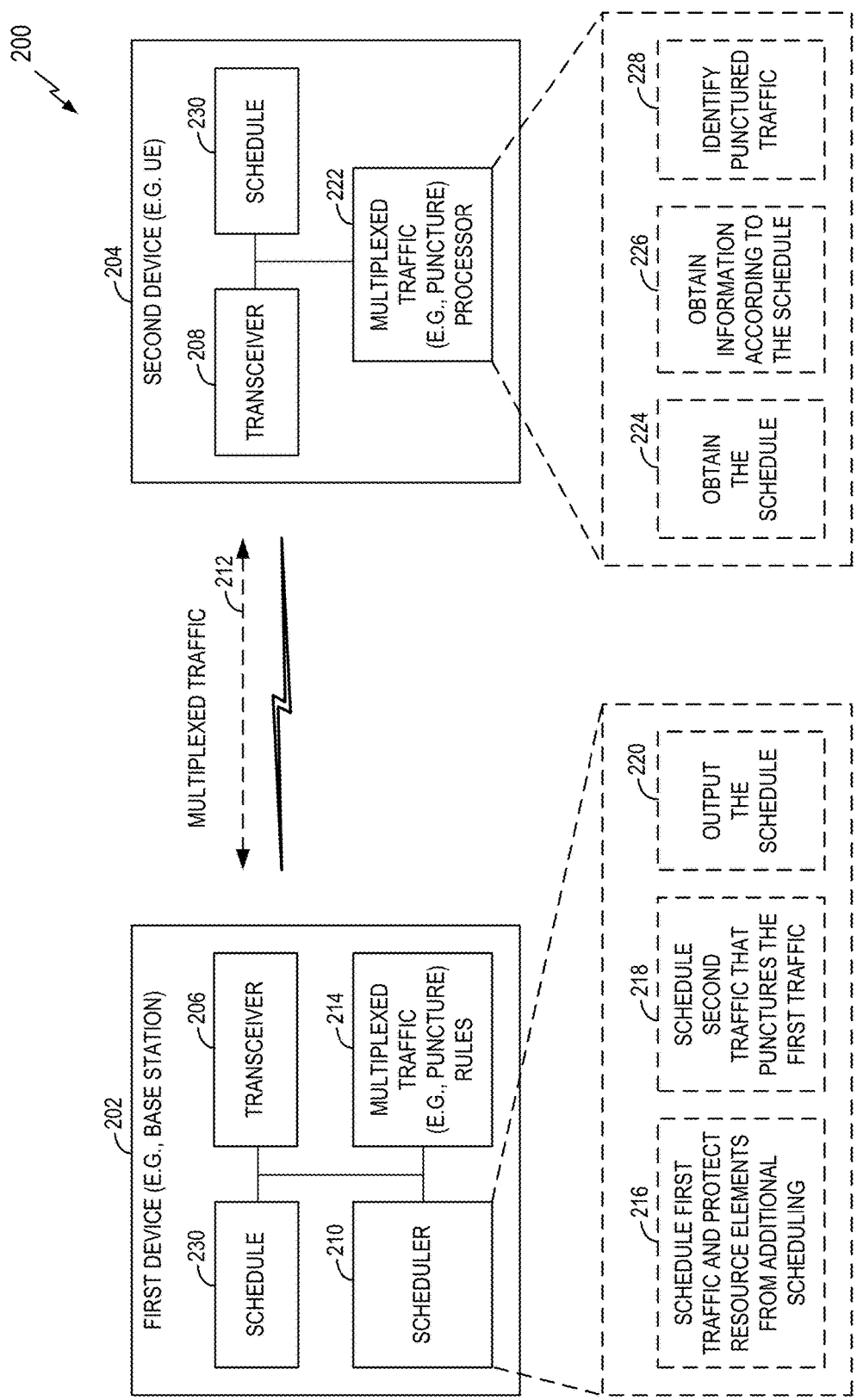
FIG. 2 is a block diagram illustrates an example of multiplexing of different types of traffic in accordance with some aspects of the disclosure.

FIG. 2 illustrates an example of a communication system 200 that supports co-existence in accordance with the teachings herein. The communication system 200 includes a first device 202 (e.g., a base station) that communicates with a second device 204 (e.g., a UE) via wireless communication. Typically, the communication system 200 will include other wireless communication devices (e.g., other base stations and UEs). To reduce the complexity of FIG. 2, however, only the first device 202 and the second device 204 are shown. In some implementations, the first device 202 and the second device 204 may correspond to the TRP 106 and the UE 102 of FIG. 1, respectively.

The first device 202 and the second device 204 include respective RF transceivers 206 and 208 (e.g., including PHY and MAC functionality) for communicating via scheduled wireless communication resources. A scheduler 210 defines the schedule 230 to be used by the first device 202 and the second device 204 for the wireless communication. In some aspects, the first device 202 may be referred to as a scheduling entity and the second device 204 referred to as a scheduled entity.

In some cases, the first device 202 and the second device 204 will multiplex different types of traffic 212 (e.g., with different latency requirements and/or reliability requirements) over the wireless communication resources. For example, the first device 202 and the second device 204 may multiplex MiCr data with eMBB control signaling and/or nominal control signaling.

The disclosure relates in some aspects to managing the multiplexing of different types of traffic to mitigate collisions that could otherwise occur as a result of the multiplexing. The first device 202 and/or the second device 204 may use one or more rules 214 for multiplexing the traffic 212 in a manner that mitigates potential collisions (e.g., due to puncturing) that could affect control signaling.

To this end, the scheduler 210 includes functionality to schedule first traffic and protect resource elements from additional scheduling 216. For example, the rules 214 may specify that a portion of the scheduled resource elements (e.g., that are scheduled to carry control information) are to be exempt from being punctured. In other words, further scheduling of these resource elements (e.g., for a particular transmission such as a TTI) is prohibited. The scheduler 210 also includes functionality to schedule second traffic that punctures the first traffic 218, without puncturing the protected resource elements. Finally, the scheduler 210 includes functionality to output the schedule 220 (e.g., for transmission to the second device 204).

The second device 204 includes a multiplexed traffic processor 222 to process received traffic that is subject to puncture. To this end, the multiplexed traffic processor 222 includes functionality to obtain the schedule 224 (e.g., the schedule 230 sent by the first device 202). In addition, the multiplexed traffic processor 222 includes functionality to obtain information according to the schedule 224. For example, the multiplexed traffic processor 222 may receive resource elements that carry first traffic and second traffic according to the schedule that were sent by the first device 202. Finally, the multiplexed traffic processor 222 includes functionality to identify punctured traffic 228. For example, the multiplexed traffic processor 222 may use the schedule to determine where the second traffic has been scheduled in the resource elements originally allocated for the first traffic. The multiplexed traffic processor 222 may then output the recovered second traffic, as well as the first traffic (with the punctured bits being indicated as such or removed).

Several techniques are disclosed for mitigating potential collisions (e.g., interference management). In some aspects, collisions to control signaling are mitigated by prohibiting puncturing by one type of traffic (e.g., higher priority traffic) in a control region of a TTI scheduled for another type of traffic (e.g., lower priority traffic). In some aspects, collisions to control signaling are mitigated by defining a puncture-free region in a control region of a TTI scheduled for lower priority traffic. In some aspects, collisions to control signaling are mitigated by defining an indicator channel for a control region of a TTI scheduled for lower priority traffic, where the indicator channel points to a later control region. In some aspects, collisions to control signaling are mitigated by defining an indicator channel for a control region of a TTI scheduled for lower priority traffic, where the indicator channel indicates that the actual start of the control region is delayed. In some aspects, collisions to control signaling are mitigated by transmitting one type of traffic (e.g., higher priority traffic) in a control region of a TTI scheduled for another type of traffic (e.g., lower priority traffic) in conformance with a search space for the other type of traffic.

Example of Traffic Multiplexing

An example of multiplexing of MiCr traffic and eMBB will be described with reference to FIGS. 3-5. It should be appreciated that the teachings herein could be applicable to other types of traffic. In some aspects, this traffic multiplexing could be supported by the components of FIGS. 1 and 2.

Figure 3:
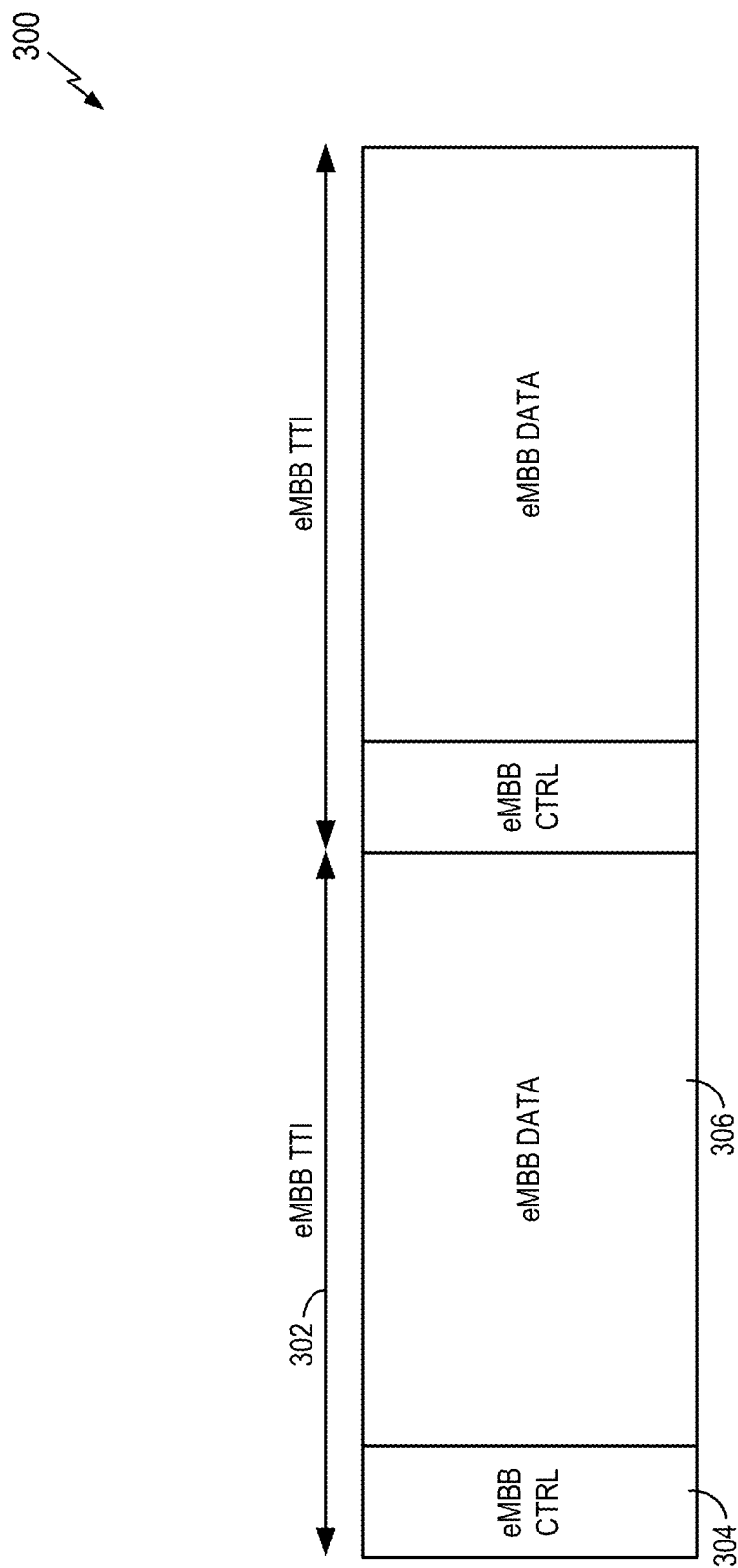
FIG. 3 is a diagram illustrating an example of scheduling of traffic on wireless communication resources in accordance with some aspects of the disclosure.

FIG. 3 depicts an example TTI allocation 300 for eMBB traffic. Within each TTI (e.g., an eMBB TTI 302), a control region (e.g., an eMBB CTRL region 304) and a data region (e.g., an eMBB DATA region 306) are defined.

In some aspects, mission critical traffic may require lower latency and/or higher reliability as compared to nominal traffic. For example, mission critical traffic may be associated with applications where transmitted data needs to be received and decoded successfully at a receiver within a strict deadline (e.g., ultra-low latency). Examples of applications that may employ mission critical traffic include, without limitation, virtual surgeries, automobile traffic control (e.g., traffic grid), and autonomous control over objects (e.g., autonomous automobiles, drone-type air vehicles, and/or other types of autonomous control systems using wireless communication).

Table 1 describes an example of relative requirements for MiCr traffic and eMBB traffic.

TABLE 1

| REQUIREMENTS | LATENCY | RELIABILITY | SPECTRUM EFFICIENCY |
|---|---|---|---|
| eMBB | LOW AVERAGE LATENCY | HIGH RELIABILITY | HIGH SPECTRUM EFFICIENCY |
| MiCr | SUB-MS HARD LATENCY BOUND | VERY HIGH RELIABILITY | — |

To support the high spectrum efficiency requirement for eMBB services, relatively long TTIs may be used for these services. For example, TTI lengths of 0.5 milliseconds (ms), 1 ms, or 2 ms may be used to keep traffic overhead relatively low.

In some aspects, a TTI corresponds to a scheduling interval. Thus, the length of a TTI may dictate how frequently a device can communicate information. The scheduling of the traffic that uses a shorter TTI happens at a finer time granularity as compared to the traffic that uses a longer TTI (e.g., the scheduling of the former traffic happens more frequently as compared to the latter traffic).

To support the stringent latency and reliability requirement for MiCr services, relatively short TTIs (e.g., sub-millisecond TTIs) may be used for these services. For example, TTI lengths of 8 microseconds (μs), 16 μs, 31 μs, 61 μs, or 125 μs may be used for MiCr services.

In 5G wireless communications, both eMBB services and MiCr services may be supported. As a result, a 5G device may have to multiplex eMBB traffic and MiCr traffic within the same time-frequency resources.

Due to the sporadic nature of MiCr transmission and its more stringent latency and reliability requirement in this example, MiCr traffic may have a higher priority than eMBB traffic. Consequently, MiCr traffic may be allowed to "puncture" resource elements that have already been allocated to eMBB traffic. For example, the scheduling of the MiCr traffic may overwrite the scheduling decision for the eMBB traffic. In some cases, puncturing may result in data being overwritten. For example, if eMBB has active traffic, then MiCr data puncturing the resources reserved for eMBB could result in overwriting the eMBB traffic. In some cases, puncturing might not result in data being overwritten. For example, if eMBB has no traffic, then MiCr could just puncture the resources reserved for eMBB, without overwriting any eMBB traffic. As used herein, the term "puncture" generally refers to use of a resource scheduled for other traffic.

Figure 4:
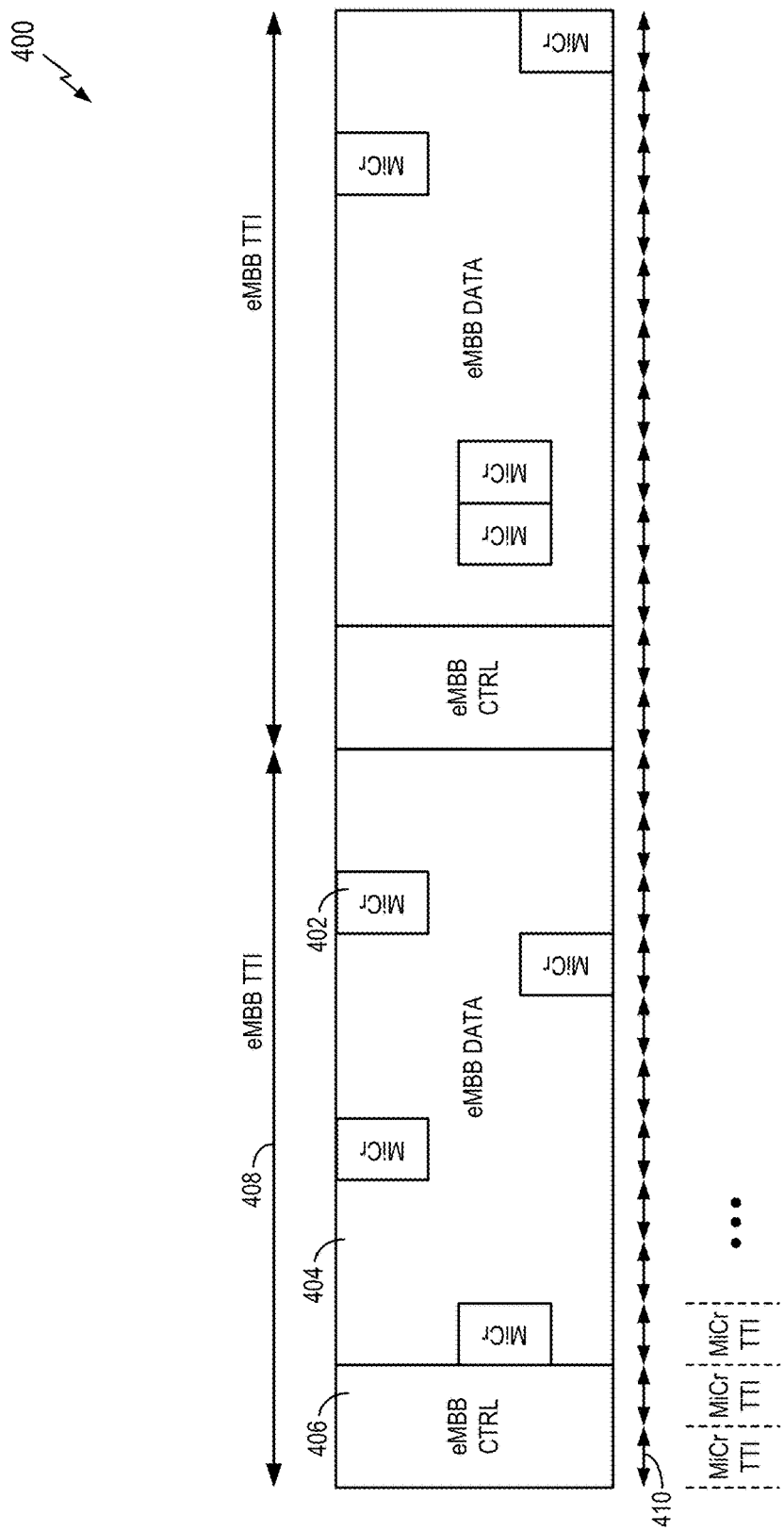
FIG. 4 is a diagram illustrating an example of scheduling of traffic on wireless communication resources, with puncturing, in accordance with some aspects of the disclosure.

FIG. 4 depicts an example TTI allocation 400 for eMBB traffic where MiCr traffic has punctured some of the resource elements for the eMBB data regions. For example, several MiCr resource elements (e.g., an MiCr block 402) have been scheduled in the eMBB DATA region 404. In this case, however, MiCr traffic has not punctured any of the resource elements for the eMBB control regions (e.g., an eMBB CTRL region 406).

FIG. 4 also shows an example of the TTI lengths for the eMBB traffic and the MiCr traffic. In this example, the length of an eMBB TTI (e.g., an eMBB TTI 408) is much longer than the length of an MiCr TTI (e.g., an MiCr TTI 410).

If MiCr traffic punctures the eMBB data region, eMBB data can still be recovered. For example, the wireless communication devices could use a media access control (MAC) layer forward error correction (FEC) code for this purpose. If MiCr traffic punctures the eMBB control region, however, a significant loss of efficiency may be seen. For example, if the control signal for an eMBB user is corrupted, the user may lose all of the eMBB data.

Figure 5:
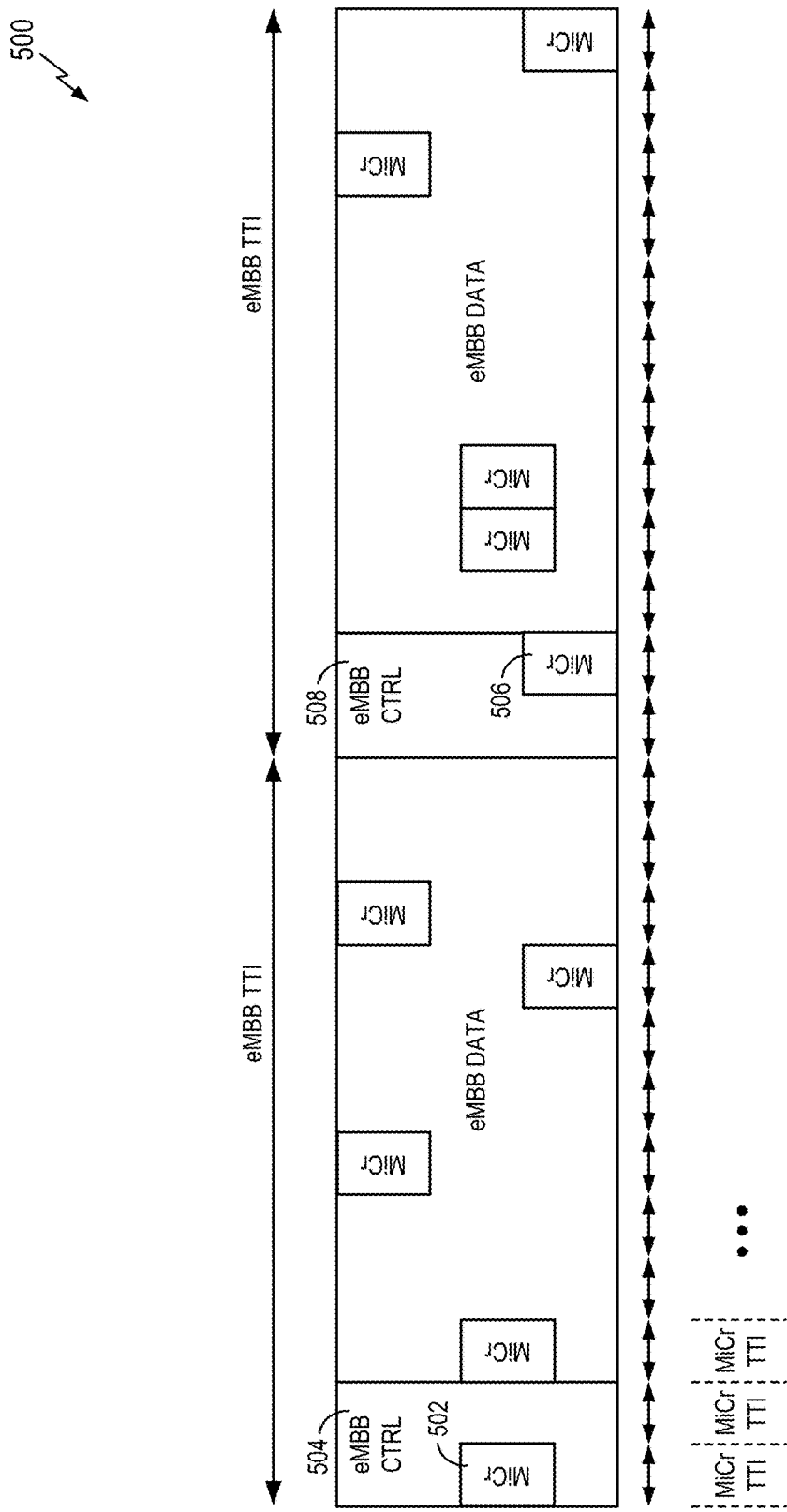
FIG. 5 is a diagram illustrating an example of scheduling of traffic on wireless communication resources, with puncturing, in accordance with some aspects of the disclosure.

FIG. 5 depicts an example TTI allocation 500 for eMBB traffic where MiCr traffic has punctured some of the resource elements for the eMBB control regions and data regions. For example, several MiCr resource elements (e.g., an MiCr block 502) have been scheduled in an eMBB CTRL region 504. In addition, several MiCr resource elements (e.g., an MiCr block 506) have been scheduled in an eMBB CTRL region 508.

The disclosure relates in some aspects to effectively multiplexing MiCr data with eMBB control signaling. In the discussion that follows (e.g., with reference to FIGS. 6-10), several techniques are described for mitigating collisions between MiCr data and eMBB control signaling. These techniques may be applicable to other types of traffic as well. In some aspects, these techniques could be supported by the components of FIGS. 1 and 2.

Exempt Control Region

Figure 6:
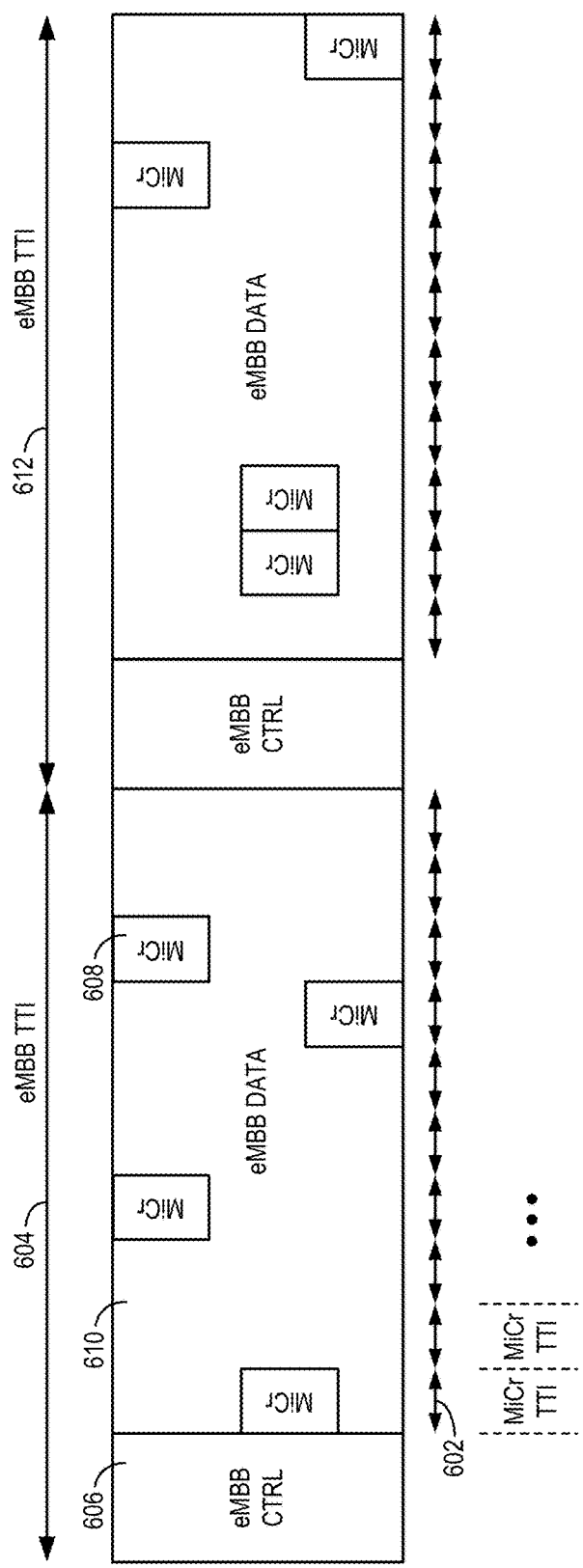
FIG. 6 is a diagram illustrating an example of scheduling of traffic on wireless communication resources to avoid collisions in accordance with some aspects of the disclosure.

Referring to FIG. 6, in a first technique, an eMBB control region is completely exempt from puncturing by MiCr traffic. In some aspects, the eMBB ctrl region may contain control messages and demodulation reference signals for control. Thus, this information is protected from being punctured by MiCr traffic. This technique may result in a latency increase for MiCr traffic and/or a reduction in capacity for MiCr traffic.

As shown in FIG. 6, the first MiCr TTI 602 in the eMBB TTI 604 comes after the eMBB control resource elements (eMBB CTRL 606). Thus, MiCr traffic (e.g., MiCr 608) is only scheduled in the eMBB data 610. MiCr traffic is scheduled in a similar manner in the eMBB TTI 612.

Puncture-Free Region

Figure 7:
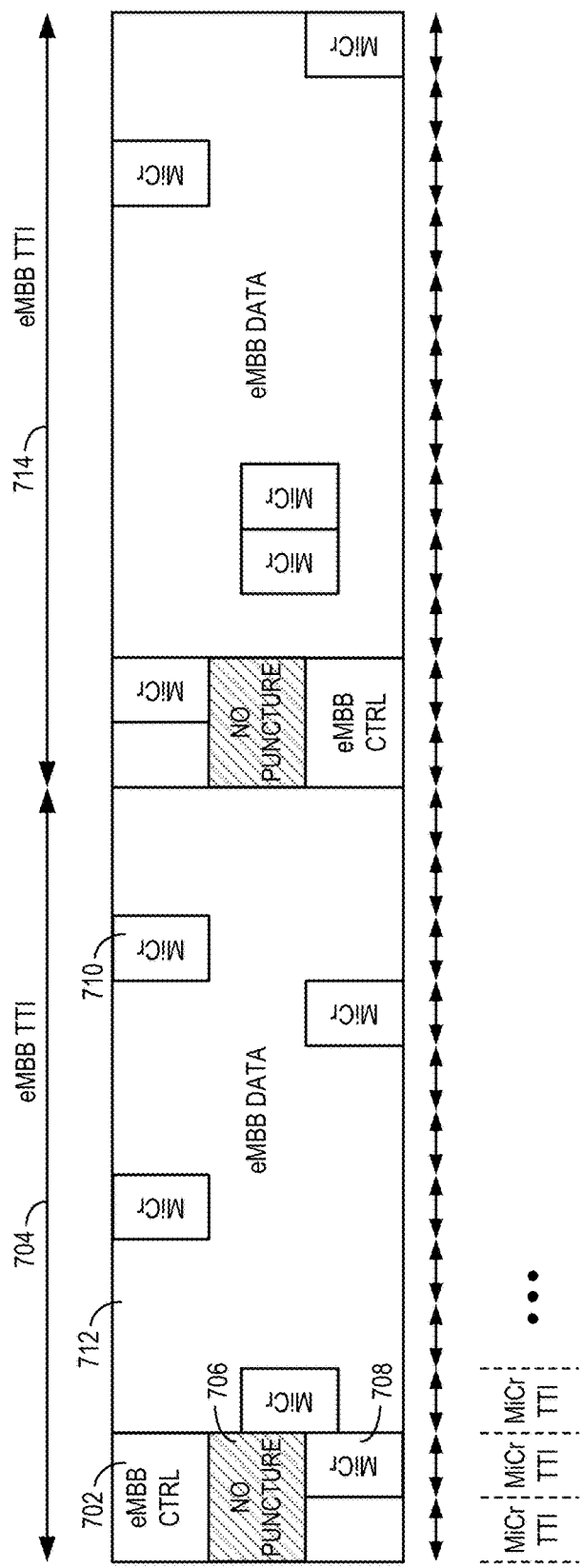
FIG. 7 is a diagram illustrating another example of scheduling of traffic on wireless communication resources to avoid collisions in accordance with some aspects of the disclosure.

Referring to FIG. 7, in a second technique, part of the eMBB control region is exempt from being puncturing by MiCr traffic. For example, a certain minimum amount of bandwidth for eMBB control signaling may be designated as puncture-free. This technique may result in a latency increase for MiCr traffic. This technique may result in a loss (e.g., a relatively large loss) in eMBB efficiency due to the potential loss of resource elements for eMBB control due to MiCr puncturing.

The puncture-free region need not be contiguous in time or frequency. Also, a device (e.g., an eNB) may transmit (e.g., broadcast) an indication of the location of the puncture-free region (e.g., via a system information block (SIB) or a master information block (MIB)). In addition, a device may schedule high priority control signaling (e.g., emergency alerts) within the puncture-free region to protect the integrity of this signaling.

As shown in FIG. 7, in an eMBB CTRL region 702 of an eMBB TTI 704, some of the resource elements are reserved as a no-puncture region 706. Thus, any MiCr traffic (e.g., an MiCr block 708) scheduled in the eMBB CTRL region 702 will be outside of the no-puncture region 706. MiCr traffic (e.g., an MiCr block 710) can also be scheduled in the eMBB data 712. MiCr traffic is scheduled in a similar manner in the eMBB TTI 714.

Indicator Channel—Additional Control Region

Figure 8:
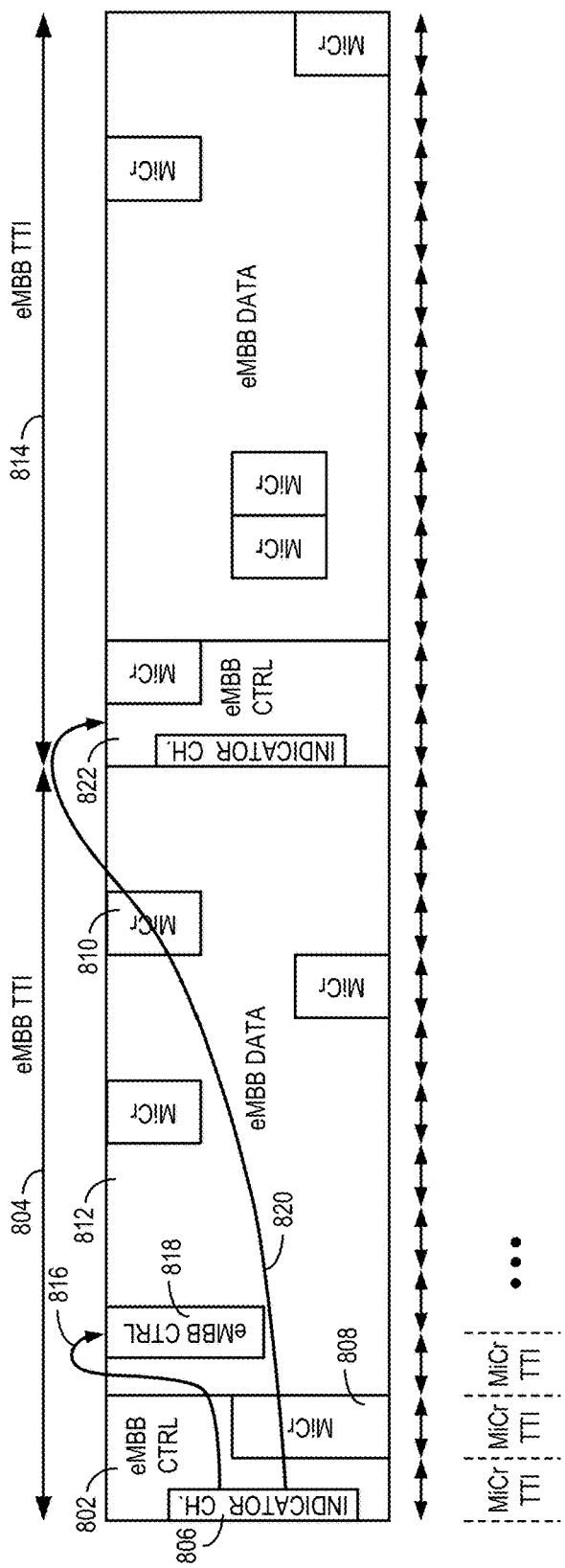
FIG. 8 is a diagram illustrating another example of scheduling of traffic on wireless communication resources to avoid collisions in accordance with some aspects of the disclosure.

Referring to FIG. 8, in a third technique, the eMBB control region includes an indicator channel. The indicator channel identifies (e.g., points to) a later-in-time control region to search (e.g., a later symbol or the next TTI). The later-in-time control region may be located, for example, in a data region that is not currently scheduled for data transmission.

This technique involves the allocation of an extra indicator channel. In some cases, the indicator channel may be a single search space in the eMBB control region. If the eMBB control is moved to a later symbol, this could disrupt the processing timeline at the receiver (e.g., a UE) since control information may be received later in time.

As shown in FIG. 8, in an eMBB CTRL region 802 of an eMBB TTI 804, some of the resource elements are reserved for an indicator channel 806. In some aspects, to protect the indicator channel 806, any MiCr traffic (e.g., an MiCr block 808) scheduled in the eMBB CTRL region 802 may be restricted to be outside of the indicator channel 806. MiCr traffic (e.g., an MiCr block 810) can also be scheduled in the eMBB data 812. MiCr traffic is scheduled in a similar manner in the subsequent eMBB TTI 814.

In the example of FIG. 8, the indicator channel 806 points 816 to a subsequent block of resource elements (an eMBB CTRL region 818). In addition, the indicator channel 806 points 820 to an eMBB CTRL region 822 of the subsequent eMBB TTI 814.

Indicator Channel—Delayed Control Region

Figure 9:
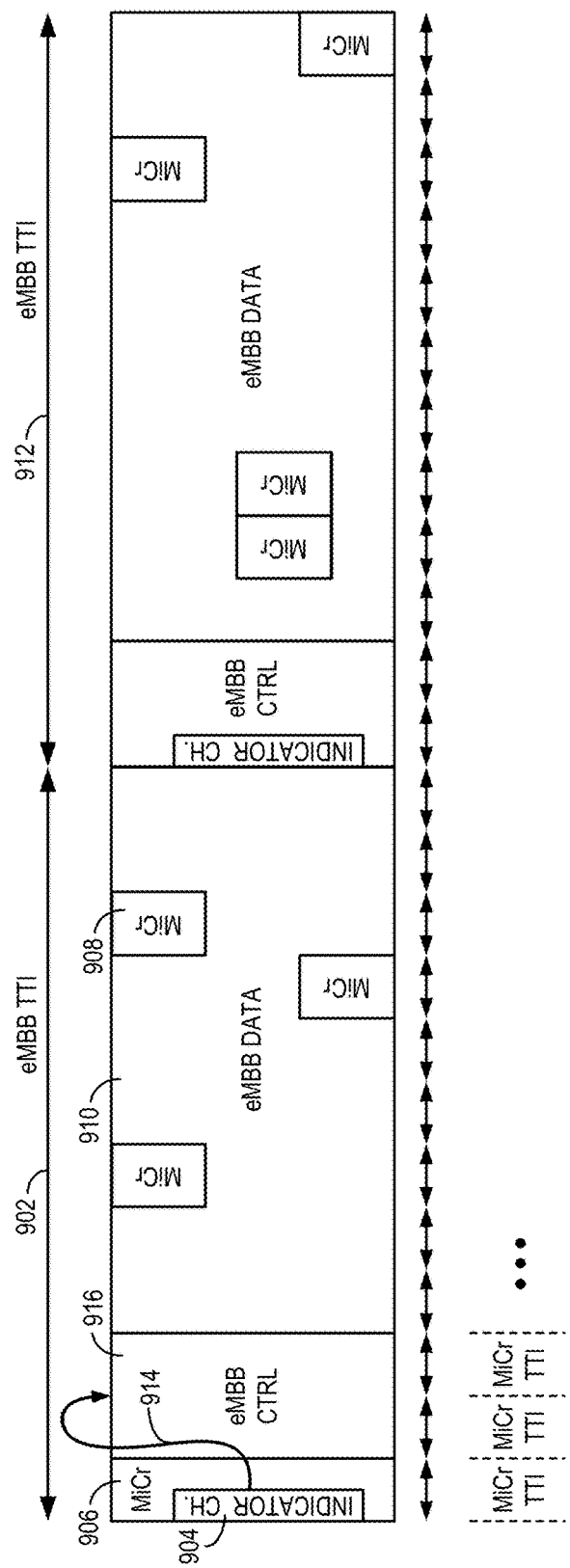
FIG. 9 is a diagram illustrating another example of scheduling of traffic on wireless communication resources to avoid collisions in accordance with some aspects of the disclosure.

Referring to FIG. 9, in a fourth technique, the eMBB control region again includes an indicator channel. In this case, the indicator channel indicates that the starting TTI for the eMBB traffic is delayed to yield to MiCr puncturing in the first part of the scheduled TTI. Again, this technique requires the allocation of an extra indicator channel. Moreover, the delay of the eMBB data may result in a mismatch in a demodulation reference signal (DMRS)-based Rnn (interference-plus-noise covariance matrix) calculation (e.g., because the control and data regions might not be aligned across different cells).

As shown in FIG. 9, one subset of the resource elements of an eMBB TTI 902 is reserved for an indicator channel 904. In some aspects, to protect the indicator channel 904, any MiCr traffic (e.g., an MiCr block 906) scheduled in the beginning of the eMBB TTI 902 may be restricted to be outside of the indicator channel 904. The indicator channel 904 points 914 to the start of the eMBB CTRL region 916. MiCr traffic (e.g., an MiCr block 908) can also be scheduled in the eMBB data 910. MiCr traffic is scheduled in a similar manner in the subsequent eMBB TTI 912.

Conformance to Search Space

Figure 10:
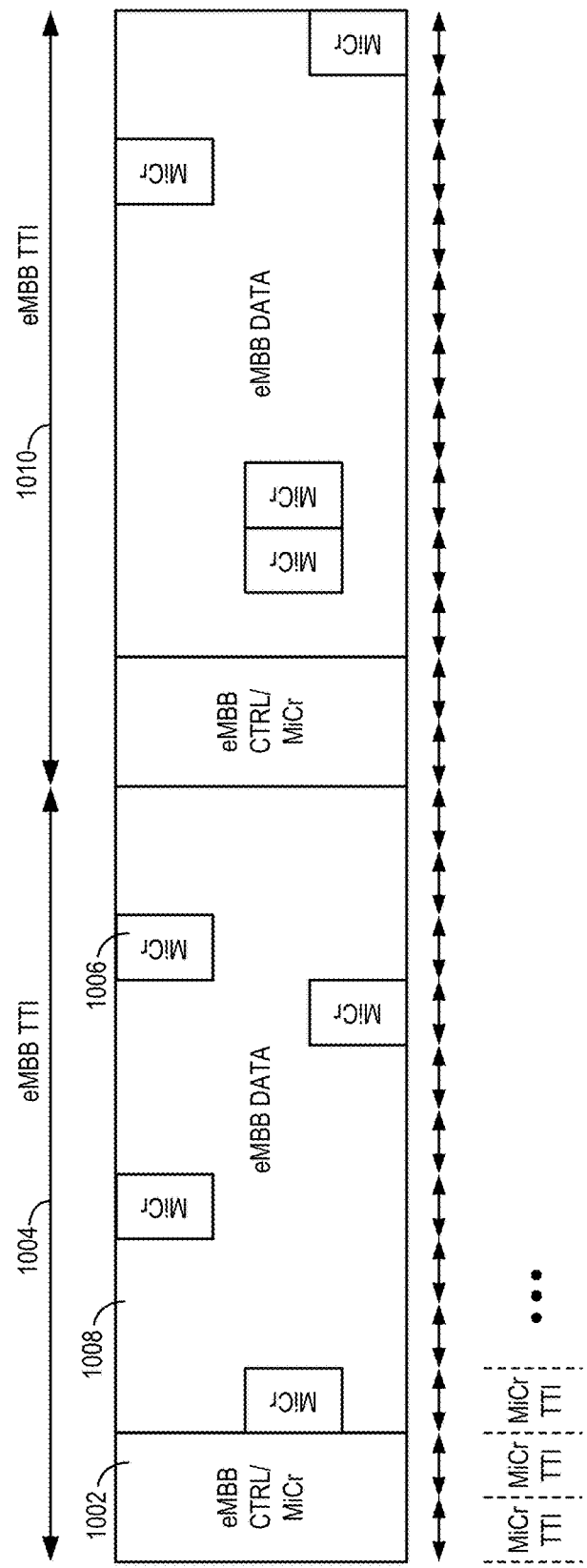
FIG. 10 is a diagram illustrating another example of scheduling of traffic on wireless communication resources to avoid collisions in accordance with some aspects of the disclosure.

Referring to FIG. 10, in a fifth technique, MiCr data is transmitted in a manner that conforms to the eMBB search-space (e.g., as if the MiCr data is an eMBB control message). In this case, a UE performs blind decoding on a received TTI and determines whether the decoded message is eMBB control signaling or MiCr data. Thus, in this case, an indicator channel is not needed. However, there may be some loss of eMBB control capacity since MiCr data may be scheduled during the eMBB control region. The fifth technique will now be described in more detail.

In the control region of the eMBB TTI, the control messages for different UEs are transmitted on different sets of resource elements, following a certain search-space configuration. For a specific UE, there are multiple fixed locations where the UE's control message may reside. For example, an eNB may have the freedom to choose one of the fixed locations to send the control message to that UE, and the UE has to check all these locations for a potential control message.

For MiCr traffic, there may be an additional MiCr-control channel to tell the UE where to find the MiCr traffic. In general, there is no restriction on which set of resource elements the puncture could happen. In this regard, the MiCr puncturing could partially overwrite the control resources for multiple UEs, and thus could hurt the control decoding of multiple UEs.

The fifth technique confines the set of resource elements on which the MiCr puncturing could happen to the search-space design of the eMBB control. For each UE, the UE tries to perform decoding across its entire search-space (e.g., pre-configured sets of resources), with the understanding that the contents within one of the resource sets in its search-space could either be an eMBB control message for the UE, or mission critical data destined for the UE.

As shown in FIG. 10, an eMBB CTRL region 1002 of an eMBB TTI 1004 can also be used for MiCr data. MiCr traffic (e.g., an MiCr block 1006) can also be scheduled in the eMBB data 1008. MiCr traffic is scheduled in a similar manner in the subsequent eMBB TTI 1010.

First Example Apparatus

Figure 11:
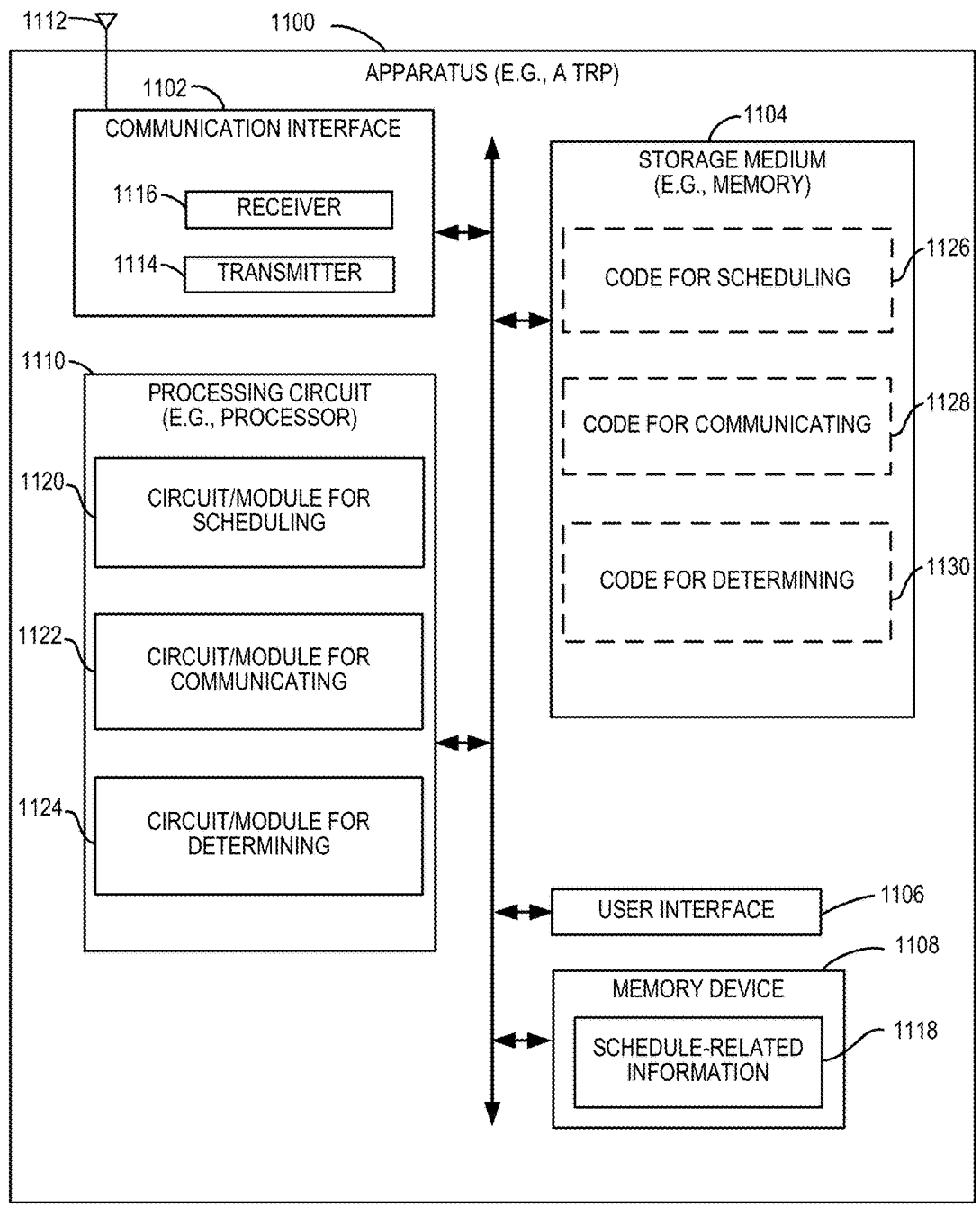
FIG. 11 is a block diagram of an example hardware implementation for an apparatus (e.g., an electronic device) that can support traffic multiplexing in accordance with some aspects of the disclosure.

FIG. 11 illustrates a block diagram of an example hardware implementation of an apparatus 1100 configured to communicate (e.g., using multiplexing) according to one or more aspects of the disclosure. The apparatus 1100 could embody or be implemented within a transmit receive point (TRP), a scheduling entity, an access point, a UE, or some other type of device that supports multiplexing as taught herein. In various implementations, the apparatus 1100 could embody or be implemented within a base station, an access terminal, or some other type of device. In various implementations, the apparatus 1100 could embody or be implemented within a server, a network entity, a mobile phone, a smart phone, a tablet, a portable computer, a personal computer, a sensor, an alarm, a vehicle, a machine, an entertainment device, a medical device, or any other electronic device having circuitry.

The apparatus 1100 includes a communication interface (e.g., at least one transceiver) 1102, a storage medium 1104, a user interface 1106, a memory device (e.g., a memory circuit) 1108, and a processing circuit 1110 (e.g., at least one processor). In various implementations, the user interface 1106 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 11. The signaling bus may include any number of interconnecting buses and bridges depending on the specific application of the processing circuit 1110 and the overall design constraints. The signaling bus links together various circuits such that each of the communication interface 1102, the storage medium 1104, the user interface 1106, and the memory device 1108 are coupled to and/or in electrical communication with the processing circuit 1110. The signaling bus may also link various other circuits (not shown) such as timing sources, peripherals, voltage regulators, and power management circuits, which are well known in the art, and therefore, will not be described any further.

The communication interface 1102 may be adapted to facilitate wireless communication of the apparatus 1100. For example, the communication interface 1102 may include circuitry and/or programming adapted to facilitate the communication of information bi-directionally with respect to one or more communication devices in a network. Thus, in some implementations, the communication interface 1102 may be coupled to one or more antennas 1112 for wireless communication within a wireless communication system. In some implementations, the communication interface 1102 may be configured for wire-based communication. For example, the communication interface 1102 could be a bus interface, a send/receive interface, or some other type of signal interface including drivers, buffers, or other circuitry for outputting and/or obtaining signals (e.g., outputting signal from and/or receiving signals into an integrated circuit). The communication interface 1102 can be configured with one or more standalone receivers and/or transmitters, as well as one or more transceivers. In the illustrated example, the communication interface 1102 includes a transmitter 1114 and a receiver 1116.

The memory device 1108 may represent one or more memory devices. As indicated, the memory device 1108 may maintain schedule-related information 1118 along with other information used by the apparatus 1100. In some implementations, the memory device 1108 and the storage medium 1104 are implemented as a common memory component. The memory device 1108 may also be used for storing data that is manipulated by the processing circuit 1110 or some other component of the apparatus 1100.

The storage medium 1104 may represent one or more computer-readable, machine-readable, and/or processor-readable devices for storing programming, such as processor executable code or instructions (e.g., software, firmware), electronic data, databases, or other digital information. The storage medium 1104 may also be used for storing data that is manipulated by the processing circuit 1110 when executing programming. The storage medium 1104 may be any available media that can be accessed by a general purpose or special purpose processor, including portable or fixed storage devices, optical storage devices, and various other mediums capable of storing, containing or carrying programming.

By way of example and not limitation, the storage medium 1104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1104 may be embodied in an article of manufacture (e.g., a computer program product). By way of example, a computer program product may include a computer-readable medium in packaging materials. In view of the above, in some implementations, the storage medium 1104 may be a non-transitory (e.g., tangible) storage medium.

The storage medium 1104 may be coupled to the processing circuit 1110 such that the processing circuit 1110 can read information from, and write information to, the storage medium 1104. That is, the storage medium 1104 can be coupled to the processing circuit 1110 so that the storage medium 1104 is at least accessible by the processing circuit 1110, including examples where at least one storage medium is integral to the processing circuit 1110 and/or examples where at least one storage medium is separate from the processing circuit 1110 (e.g., resident in the apparatus 1100, external to the apparatus 1100, distributed across multiple entities, etc.).

Programming stored by the storage medium 1104, when executed by the processing circuit 1110, causes the processing circuit 1110 to perform one or more of the various functions and/or process operations described herein. For example, the storage medium 1104 may include operations configured for regulating operations at one or more hardware blocks of the processing circuit 1110, as well as to utilize the communication interface 1102 for wireless communication utilizing their respective communication protocols. In some aspects, the storage medium 1104 may be a non-transitory computer-readable medium storing computer-executable code, including code to perform operations as described herein.

The processing circuit 1110 is generally adapted for processing, including the execution of such programming stored on the storage medium 1104. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1110 is arranged to obtain, process and/or send data, control data access and storage, issue commands, and control other desired operations. The processing circuit 1110 may include circuitry configured to implement desired programming provided by appropriate media in at least one example. For example, the processing circuit 1110 may be implemented as one or more processors, one or more controllers, and/or other structure configured to execute executable programming Examples of the processing circuit 1110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1110 are for illustration and other suitable configurations within the scope of the disclosure are also contemplated.

According to one or more aspects of the disclosure, the processing circuit 1110 may be adapted to perform any or all of the features, processes, functions, operations and/or routines for any or all of the apparatuses described herein. For example, the processing circuit 1110 may be configured to perform any of the steps, functions, and/or processes described herein with respect to FIGS. 1-10 and 12-16 in various implementations. As used herein, the term "adapted" in relation to the processing circuit 1110 may refer to the processing circuit 1110 being one or more of configured, employed, implemented, and/or programmed to perform a particular process, function, operation and/or routine according to various features described herein.

The processing circuit 1110 may be a specialized processor, such as an application specific integrated circuit (ASIC) that serves as a means for (e.g., structure for) carrying out any one of the operations described herein in conjunction with FIGS. 1-10 and 12-16 in various implementations. The processing circuit 1110 may serve as one example of a means for transmitting and/or a means for receiving. In various implementations, the processing circuit 1110 may provide, at least in part, the functionality described above for the first device 202 of FIG. 2.

According to at least one example of the apparatus 1100, the processing circuit 1110 may include one or more of a circuit/module for scheduling 1120, a circuit/module for communicating 1122, or a circuit/module for determining 1124. In various implementations, the circuit/module for scheduling 1120, the circuit/module for communicating 1122, or the circuit/module for determining 1124 may provide, at least in part, the functionality described above for the first device 202 of FIG. 2.

As mentioned above, programming stored by the storage medium 1104, when executed by the processing circuit 1110, causes the processing circuit 1110 to perform one or more of the various functions and/or process operations described herein. For example, the programming, when executed by the processing circuit 1110, may cause the processing circuit 1110 to perform the various functions, steps, and/or processes described herein with respect to FIGS. 1-10 and 12-16 in various implementations. As shown in FIG. 11, the storage medium 1104 may include one or more of code for scheduling 1126, code for communicating 1128, or code for determining 1130. In various implementations, the code for scheduling 1126, the code for communicating 1128, or the code for determining 1130 may be executed or otherwise used to provide the functionality described herein for the circuit/module for scheduling 1120, the circuit/module for communicating 1122, or the circuit/module for determining 1124, respectively.

The circuit/module for scheduling 1120 may include circuitry and/or programming (e.g., code for scheduling 1126 stored on the storage medium 1104) adapted to perform several functions relating to, for example, scheduling signaling and/or traffic on resource elements. In some aspects, the circuit/module for scheduling 1120 (e.g., a means for scheduling) may correspond to, for example, a processing circuit.

In some implementations, the circuit/module for scheduling 1120 determines that signaling and/or traffic needs to be scheduled (e.g., based on information from the circuit/module for communicating 1122, the memory device 1108, the communication interface 1102, the receiver 1116, or some other component). The circuit/module for scheduling 1120 then determines which resource elements are available and sufficient to meet the resource requirement. The circuit/module for scheduling 1120 then outputs an indication of the schedule (e.g., designating allocations of resource elements within a TTI) to a component of the apparatus 1100 (e.g., to the circuit/module for communicating 1120, the memory device 1108, the communication interface 1102, or some other component).

In some aspects, the circuit/module for scheduling 1120 may schedule control signaling of first traffic on a first set of resource elements and data of the first traffic on a second set of resource elements, wherein at least a portion of the first set of resource elements is protected from additional scheduling. In this case, the circuit/module for scheduling 1120 may schedule second traffic on the second set of resource elements (e.g., but not on the first set of resource elements during a particular TTI).

In some aspects, the circuit/module for scheduling 1120 may schedule control signaling of first traffic on a first set of resource elements and data of the first traffic on a second set of resource elements. In this case, the circuit/module for scheduling 1120 may schedule second traffic on the second set of resource elements but not on the first set of resource elements (e.g., during a particular TTI).

In some aspects, the circuit/module for scheduling 1120 may schedule first control signaling of first traffic on a first set of resource elements, wherein a portion of the first set of resource elements is exempt from being punctured (e.g., during a particular TTI). In this case, the circuit/module for scheduling 1120 may schedule second traffic on the first set of resource elements but not the portion that is exempt from being punctured.

In some aspects, the circuit/module for scheduling 1120 may schedule first control signaling of first traffic on a first set of resource elements, wherein a portion of the first set of resource elements comprises an indication of a second set of resource elements for second control signaling of the first traffic. In this case, the circuit/module for scheduling 1120 may schedule second traffic on the first set of resource elements but not the portion that comprises the indication (e.g., during a particular TTI).

In some aspects, the circuit/module for scheduling 1120 may schedule first traffic on a transmission time interval (TTI) associated with a first set of resource elements and a second set of resource elements, wherein a portion of the first set of resource elements comprises an indication that control signaling of the first traffic commences in the second set of resource elements. In this case, the circuit/module for scheduling 1120 may schedule second traffic on the TTI but not on the portion that comprises the indication.

The circuit/module for communicating 1122 may include circuitry and/or programming (e.g., code for communicating 1128 stored on the storage medium 1104) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 1122 may communicate (e.g., send) a schedule (e.g., indicative of scheduling of first traffic and second traffic). In some aspects, the circuit/module for communicating 1122 may communicate (e.g., send or transmit) second traffic on a first set of resource elements scheduled for control signaling of first traffic. In some aspects, the circuit/module for communicating 1122 may communicate (e.g., send or transmit) data of first traffic on a second set of resource elements. In some aspects, the circuit/module for communicating 1122 may communicate (e.g., send or transmit) additional second traffic on the second set of resource elements, thereby puncturing at least one of the second set of resource elements.

In some implementations where the communicating involves receiving information, the circuit/module for communicating 1122 receives information (e.g., from the communication interface 1102, the receiver 1116, the memory device 1108, some other component of the apparatus 1100, or some other device), processes (e.g., decodes) the information, and outputs the information to another component of the apparatus 1100 (e.g., the memory device 1108 or some other component). In some scenarios (e.g., if the circuit/module for communicating 1122 includes a receiver), the communicating involves the circuit/module for communicating 1122 receiving information directly from a device that transmitted the information (e.g., via radio frequency signaling or some other type of signaling suitable for the applicable communication medium).

In some implementations where the communicating involves sending information, the circuit/module for communicating 1122 obtains information (e.g., from the memory device 1108 or some other component of the apparatus 1100), processes (e.g., encodes) the information, and outputs the processed information. In some scenarios, the communicating involves sending the information to another component of the apparatus 1100 (e.g., the transmitter 1114, the communication interface 1102, or some other component) that will transmit the information to another device. In some scenarios (e.g., if the circuit/module for communicating 1122 includes a transmitter), the communicating involves the circuit/module for communicating 1122 transmitting the information directly to another device (e.g., the ultimate destination) via radio frequency signaling or some other type of signaling suitable for the applicable communication medium.

The circuit/module for communicating 1122 (e.g., a means for communicating) may take various forms. In some aspects, the circuit/module for communicating 1122 may correspond to, for example, an interface (e.g., a bus interface, a send/receive interface, or some other type of signal interface), a communication device, a transceiver, a transmitter, a receiver, or some other similar component as discussed herein. In some implementations, the communication interface 1102 includes the circuit/module for communicating 1122 and/or the code for communicating 1128. In some implementations, the circuit/module for communicating 1122 and/or the code for communicating 1128 is configured to control the communication interface 1102 (e.g., a transceiver, a receiver, or a transmitter) to communicate the information.

The circuit/module for determining 1124 may include circuitry and/or programming (e.g., code for determining 1130 stored on the storage medium 1104) adapted to perform several functions relating to, for example, determining whether second traffic had priority over first traffic. In some aspects, the circuit/module for determining 1124 (e.g., a means for determining) may correspond to, for example, a processing circuit.

To this end, the circuit/module for determining 1124 may determine the types of each traffic (e.g., MiCr traffic, nominal traffic, etc.). For example, the circuit/module for determining 1124 may obtain this type information from the communication interface 1102, the circuit/module for communicating 1122, the memory device 1108, or some other component of the apparatus 1100. The circuit/module for determining 1124 may then identify the priority associated with each type of traffic. For example, the circuit/module for determining 1124 may obtain this type information from the memory device 1108 or some other component of the apparatus 1100. Next, the circuit/module for determining 1124 compares the priorities and outputs an indication of the comparison to the circuit/module for communicating 1122, the memory device 1108, or some other component of the apparatus 1100.

First Example Process

Figure 12:
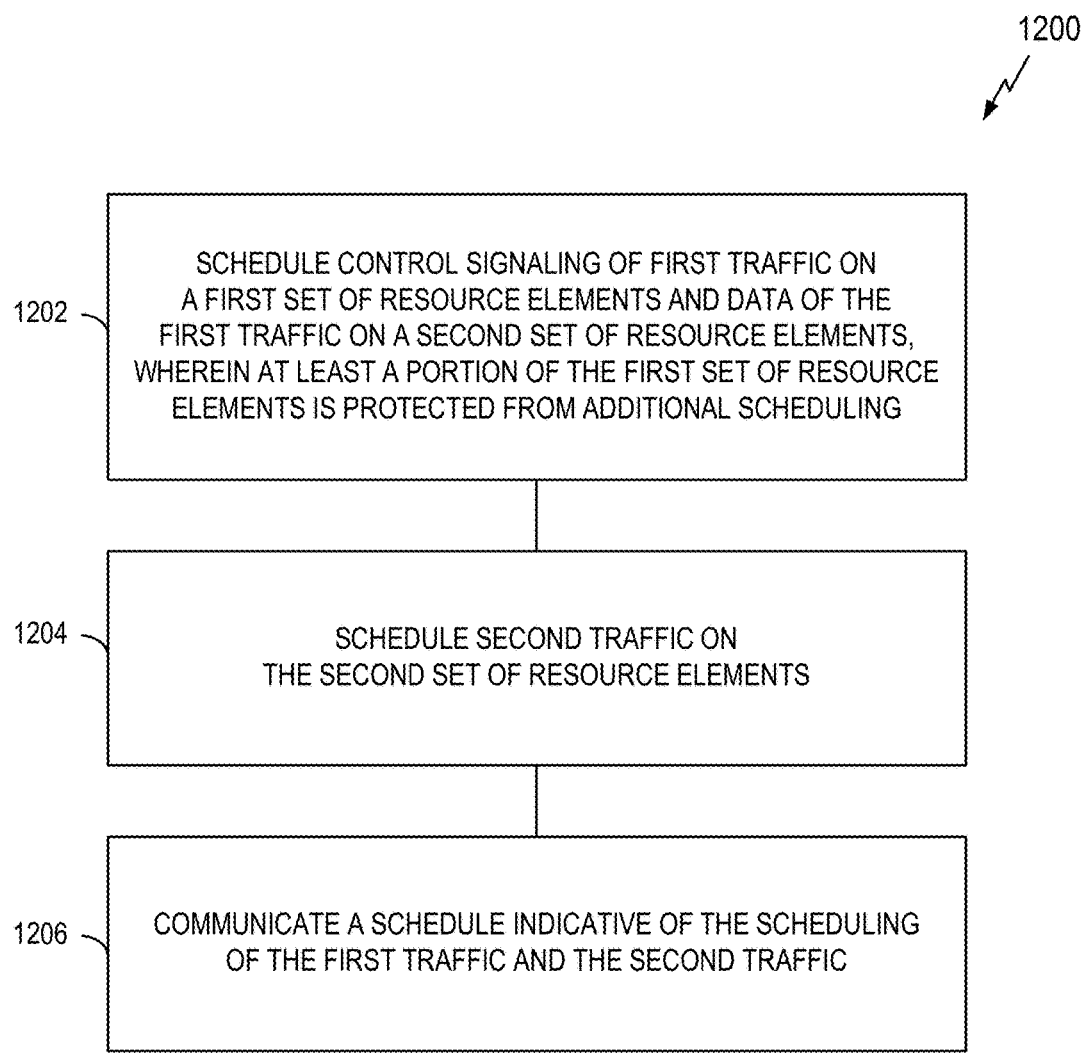
FIG. 12 is a flow diagram illustrating an example of a scheduling process in accordance with some aspects of the disclosure.

FIG. 12 illustrates a process 1200 for communication in accordance with some aspects of the disclosure. The process 1200 may take place within a processing circuit (e.g., the processing circuit 1110 of FIG. 11), which may be located in a scheduling entity, a base station, an access terminal, or some other suitable apparatus. Of course, in various aspects within the scope of the disclosure, the process 1200 may be implemented by any suitable apparatus capable of supporting communication-related operations.

At block 1202, an apparatus (e.g., a base station) schedules control signaling of first traffic on a first set of resource elements and data of the first traffic on a second set of resource elements. In some aspects, at least a portion of the first set of resource elements may be protected from additional scheduling. For example, the at least a portion of the first set of resource elements may be exempt from being punctured for a particular transmission (e.g., during a particular TTI). In some aspects, the resource elements may be time and frequency resources.

The at least a portion of the first set of resource elements may take different forms in different scenarios. In some aspects, the at least a portion of the first set of resource elements includes all of the first set of resource elements. In some aspects, the at least a portion of the first set of resource elements includes an indication of a portion of the second set of resource elements for additional control signaling of the first traffic. In some aspects, the at least a portion of the first set of resource elements includes an indication that the control signaling of the first traffic commences in the second set of resource elements.

At block 1204, the apparatus schedules second traffic on the second set of resource elements. In this aspects, this may involve not scheduling the second traffic on the at least a portion of the first set of resource elements (e.g., for a particular transmission such as a particular TTI). For example, the apparatus may puncture at least one resource element for data of the first traffic (e.g., on the second set of resource elements for a particular TTI), but not puncture any resource element for control signaling of the first traffic (e.g., in a particular TTI).

The first and second traffic may take various forms and may be handled in various ways. In some aspects, the first traffic may be scheduled during transmission time intervals (TTIs) of a first length and the second traffic may be scheduled during TTIs of a second length that is shorter than the first length. In some aspects, the first traffic may be associated with a first latency requirement; and the second traffic may be associated with a second latency requirement that is stricter than the first latency requirement. In some aspects, the first traffic may be associated with a first reliability requirement; and the second traffic may be associated with a second reliability requirement that is stricter than the first reliability requirement. In some aspects, the first traffic may be associated with a first priority; and the second traffic may be associated with a second priority that is stricter than the first priority. In some aspects, the first traffic may be mobile broadband traffic; and the second traffic may be mission critical traffic.

In some aspects, the process 1200 may involve scheduling additional second traffic on the first set of resource elements. In this case, the scheduling of the additional second traffic may include puncturing at least one but not all of the first set of resource elements for the control signaling of the first traffic.

At block 1206, the apparatus communicates a schedule indicative of the scheduling of the first traffic and the second traffic.

Second Example Process

Figure 13:
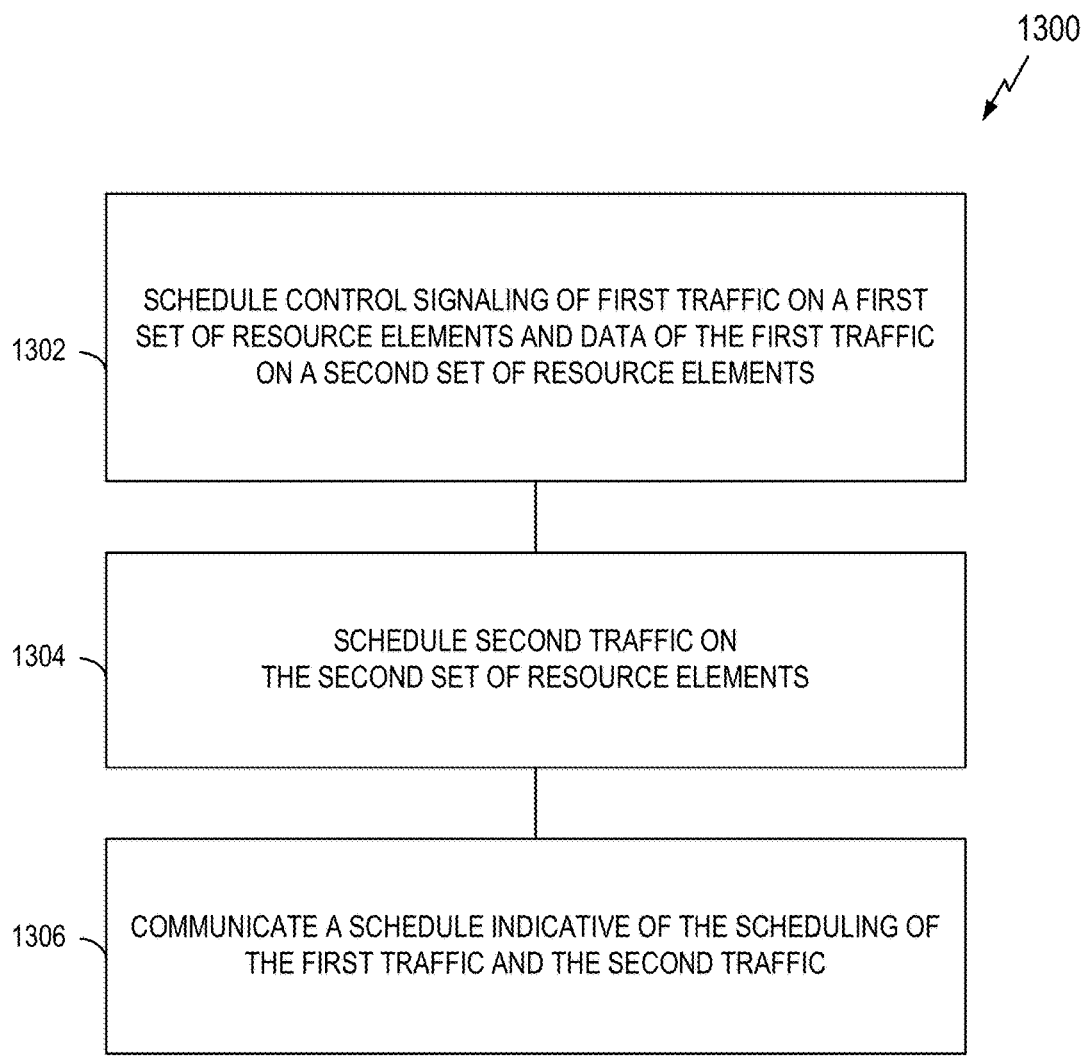
FIG. 13 is a flow diagram illustrating another example of a scheduling process in accordance with some aspects of the disclosure.

FIG. 13 illustrates a process 1300 for communication in accordance with some aspects of the disclosure. The process 1300 may take place within a processing circuit (e.g., the processing circuit 1110 of FIG. 11), which may be located in a scheduling entity, a base station, an access terminal, or some other suitable apparatus. Of course, in various aspects within the scope of the disclosure, the process 1300 may be implemented by any suitable apparatus capable of supporting communication-related operations.

At block 1302, an apparatus (e.g., a base station) schedules control signaling of first traffic on a first set of resource elements and data of the first traffic on a second set of resource elements. In some aspects, the resource elements may be time and frequency resources.

At block 1304, the apparatus schedules second traffic on the second set of resource elements. In some aspects, this may involve not scheduling the second traffic on the first set of resource elements (e.g., for a particular transmission such as a particular TTI). For example, the apparatus may puncture at least one resource element for data of the first traffic (e.g., on the second set of resource elements in a particular TTI), but not puncture any resource element for control signaling of the first traffic (e.g., in a particular TTI).

The first and second traffic may take various forms and may be handled in various ways. In some aspects, the first traffic may be scheduled during transmission time intervals (TTIs) of a first length and the second traffic may be scheduled during TTIs of a second length that is shorter than the first length. In some aspects, the first traffic may be associated with a first latency requirement; and the second traffic may be associated with a second latency requirement that is stricter than the first latency requirement. In some aspects, the first traffic may be associated with a first reliability requirement; and the second traffic may be associated with a second reliability requirement that is stricter than the first reliability requirement. In some aspects, the first traffic may be associated with a first priority; and the second traffic may be associated with a second priority that is stricter than the first priority. In some aspects, the first traffic may be mobile broadband traffic; and the second traffic may be mission critical traffic.

In some aspects, the process 1300 may include scheduling data of the first traffic on a second set of resource elements; and scheduling additional second traffic on the second set of resource elements, thereby puncturing at least one of the second set of resource elements.

At block 1306, the apparatus communicates a schedule indicative of the scheduling of the first traffic and the second traffic.

Third Example Process

Figure 14:
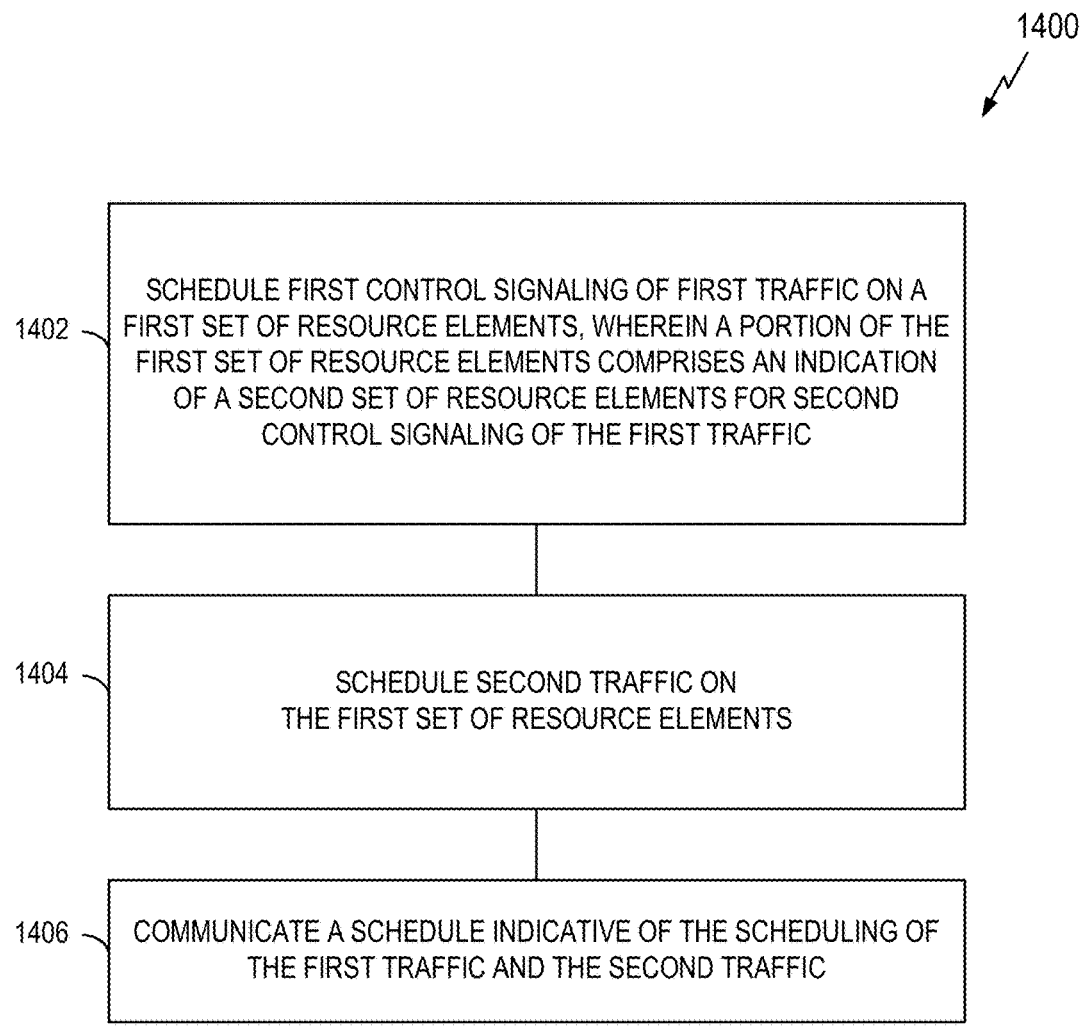
FIG. 14 is a flow diagram illustrating another example of a scheduling process in accordance with some aspects of the disclosure.

FIG. 14 illustrates a process 1400 for communication in accordance with some aspects of the disclosure. The process 1400 may take place within a processing circuit (e.g., the processing circuit 1110 of FIG. 11), which may be located in a scheduling entity, a base station, an access terminal, or some other suitable apparatus. Of course, in various aspects within the scope of the disclosure, the process 1400 may be implemented by any suitable apparatus capable of supporting communication-related operations.

At block 1402, an apparatus (e.g., a base station) schedules first control signaling of first traffic on a first set of resource elements. In some aspects, a portion of the first set of resource elements may include an indication of a second set of resource elements for second control signaling of the first traffic. In some aspects, the resource elements may be time and frequency resources.

At block 1404, the apparatus schedules second traffic on the first set of resource elements. In some aspects, this may involve not scheduling the second traffic on the portion that may include the indication (e.g., for a particular transmission such as a particular TTI). For example, the apparatus may puncture at least one but not all of the first set of resource elements (e.g., for the first control signaling of the first traffic in a particular TTI).

The first and second traffic may take various forms and may be handled in various ways. In some aspects, the first traffic may be scheduled during transmission time intervals (TTIs) of a first length and the second traffic may be scheduled during TTIs of a second length that is shorter than the first length. In some aspects, the first traffic may be associated with a first latency requirement; and the second traffic may be associated with a second latency requirement that is stricter than the first latency requirement. In some aspects, the first traffic may be associated with a first reliability requirement; and the second traffic may be associated with a second reliability requirement that is stricter than the first reliability requirement. In some aspects, the first traffic may be associated with a first priority; and the second traffic may be associated with a second priority that is stricter than the first priority. In some aspects, the first traffic may be mobile broadband traffic; and the second traffic may be mission critical traffic.

In some aspects, the process 1400 may include scheduling data of the first traffic on a third set of resource elements; and scheduling additional second traffic on the third set of resource elements, thereby puncturing at least one of the third set of resource elements.

At block 1406, the apparatus communicates a schedule indicative of the scheduling of the first traffic and the second traffic.

Fourth Example Process

Figure 15:
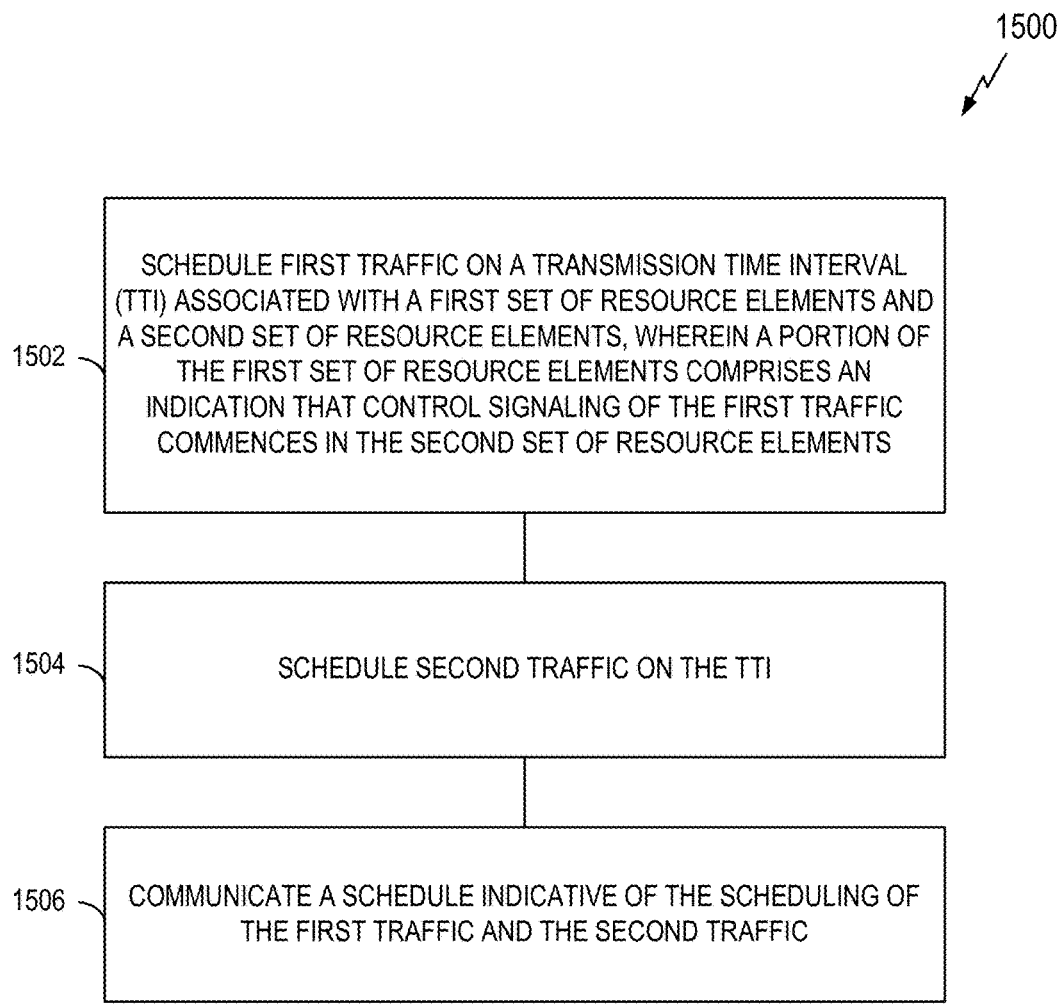
FIG. 15 is a flow diagram illustrating another example of a scheduling process in accordance with some aspects of the disclosure.

FIG. 15 illustrates a process 1500 for communication in accordance with some aspects of the disclosure. The process 1500 may take place within a processing circuit (e.g., the processing circuit 1110 of FIG. 11), which may be located in a scheduling entity, a base station, an access terminal, or some other suitable apparatus. Of course, in various aspects within the scope of the disclosure, the process 1500 may be implemented by any suitable apparatus capable of supporting communication-related operations.

At block 1502, an apparatus (e.g., a base station) schedules first traffic on a transmission time interval (TTI) associated with a first set of resource elements and a second set of resource elements. In some aspects, a portion of the first set of resource elements may include an indication that control signaling of the first traffic commences in the second set of resource elements. In some aspects, the resource elements may be time and frequency resources.

At block 1504, the apparatus schedules second traffic on the TTI. In some aspects, this may involve not scheduling the second traffic on the portion that may include the indication (e.g., for a particular transmission such as a particular TTI). For example, the apparatus may puncture some but not all of the TTI (e.g., for a particular TTI).

The first and second traffic may take various forms and may be handled in various ways. In some aspects, the first traffic may be scheduled during transmission time intervals (TTIs) of a first length and the second traffic may be scheduled during TTIs of a second length that is shorter than the first length. In some aspects, the first traffic may be associated with a first latency requirement; and the second traffic may be associated with a second latency requirement that is stricter than the first latency requirement. In some aspects, the first traffic may be associated with a first reliability requirement; and the second traffic may be associated with a second reliability requirement that is stricter than the first reliability requirement. In some aspects, the first traffic may be associated with a first priority; and the second traffic may be associated with a second priority that is stricter than the first priority. In some aspects, the first traffic may be mobile broadband traffic; and the second traffic may be mission critical traffic.

In some aspects, the process 1500 may include scheduling data of the first traffic on a third set of resource elements associated with the TTI; and scheduling additional second traffic on the third set of resource elements, thereby puncturing at least one of the third set of resource elements.

At block 1506, the apparatus communicates a schedule indicative of the scheduling of the first traffic and the second traffic.

Fifth Example Process

Figure 16:
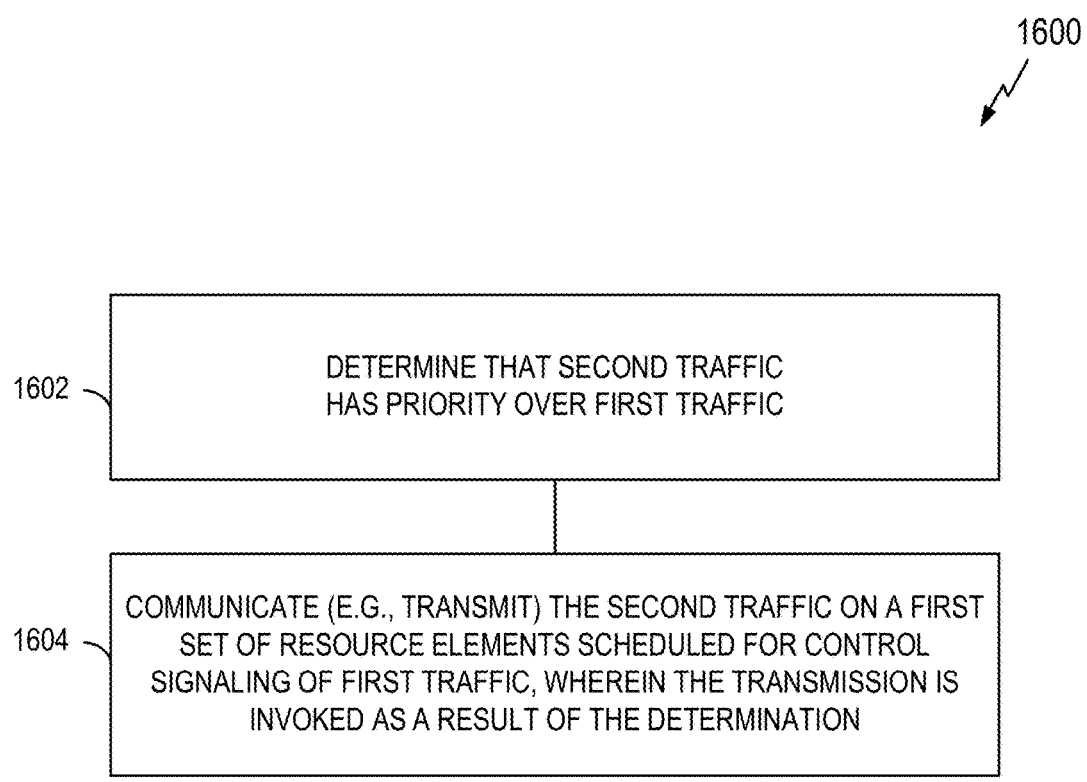
FIG. 16 is a flow diagram illustrating another example of a communication process in accordance with some aspects of the disclosure.

FIG. 16 illustrates a process 1600 for communication in accordance with some aspects of the disclosure. The process 1600 may take place within a processing circuit (e.g., the processing circuit 1110 of FIG. 11), which may be located in a scheduling entity, a base station, an access terminal, or some other suitable apparatus. Of course, in various aspects within the scope of the disclosure, the process 1600 may be implemented by any suitable apparatus capable of supporting communication-related operations.

At block 1602, an apparatus (e.g., a base station) determines that second traffic has priority over first traffic.

The first and second traffic may take various forms and may be handled in various ways. In some aspects, the first traffic may be scheduled during transmission time intervals (TTIs) of a first length and the second traffic may be scheduled during TTIs of a second length that is shorter than the first length. In some aspects, the first traffic may be associated with a first latency requirement; and the second traffic may be associated with a second latency requirement that is stricter than the first latency requirement. In some aspects, the first traffic may be associated with a first reliability requirement; and the second traffic may be associated with a second reliability requirement that is stricter than the first reliability requirement. In some aspects, the first traffic may be associated with a first priority; and the second traffic may be associated with a second priority that is stricter than the first priority. In some aspects, the first traffic may be mobile broadband traffic; and the second traffic may be mission critical traffic.

At block 1604, the apparatus communicates the second traffic on a first set of resource elements scheduled for control signaling of first traffic. In some aspects, the transmission may be invoked as a result of the determination. In some aspects, the resource elements may be time and frequency resources.

In some aspects, the process 1600 may include communicating data of the first traffic on a second set of resource elements; and communicating additional second traffic on the second set of resource elements, thereby puncturing at least one of the second set of resource elements.

Second Example Apparatus

Figure 17:
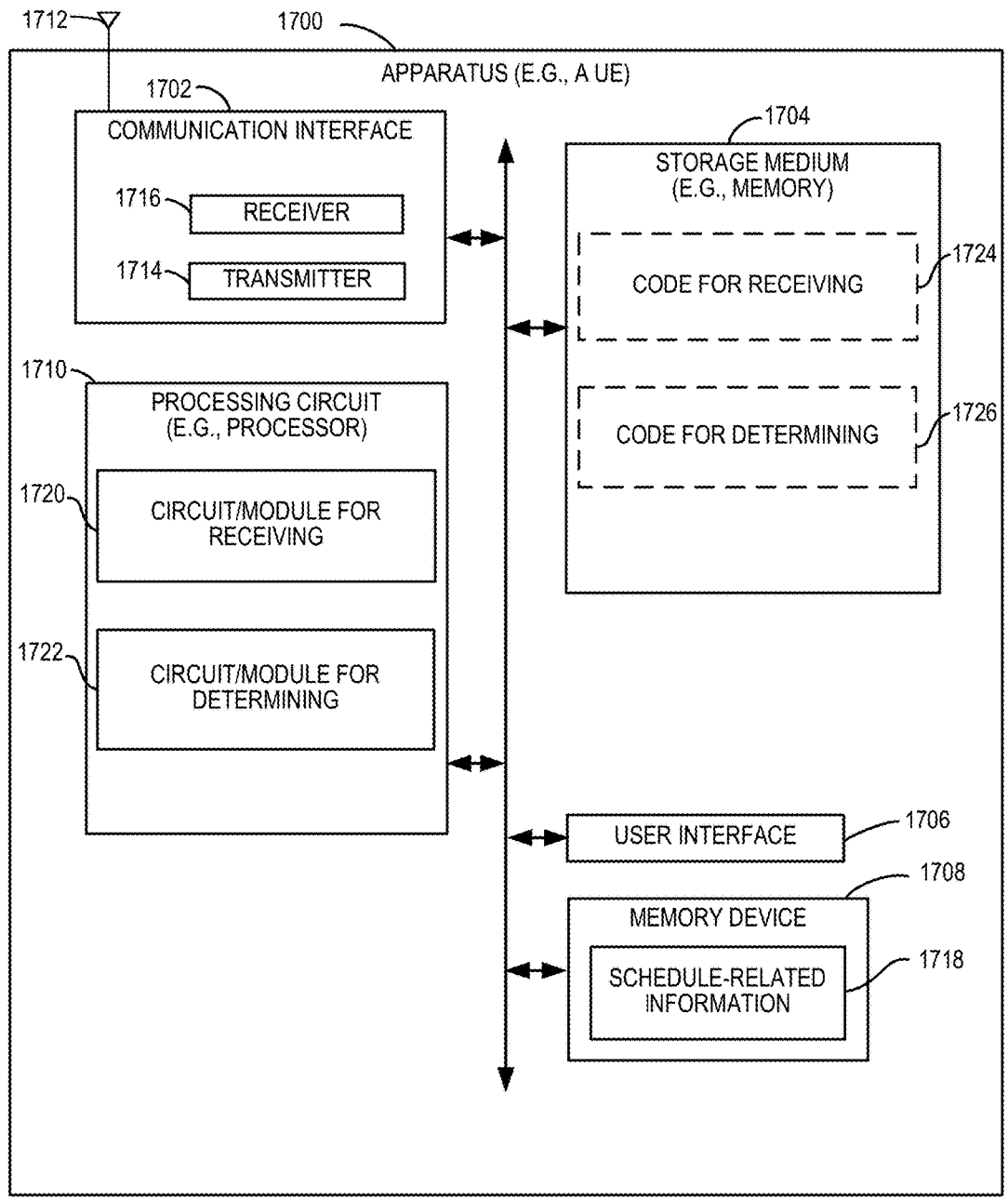
FIG. 17 is a block diagram of another example hardware implementation for an apparatus (e.g., an electronic device) that can support traffic multiplexing in accordance with some aspects of the disclosure.

FIG. 17 illustrates a block diagram of an example hardware implementation of an apparatus 1700 configured to communicate (e.g., using multiplexing) according to one or more aspects of the disclosure. The apparatus 1700 could embody or be implemented within a UE, a scheduled entity, a transmit receive point (TRP), an access point, or some other type of device that supports multiplexing as taught herein. In various implementations, the apparatus 1700 could embody or be implemented within an access terminal, a base station, or some other type of device. In various implementations, the apparatus 1700 could embody or be implemented within a mobile phone, a smart phone, a tablet, a portable computer, a server, a network entity, a personal computer, a sensor, an alarm, a vehicle, a machine, an entertainment device, a medical device, or any other electronic device having circuitry.

The apparatus 1700 includes a communication interface (e.g., at least one transceiver) 1702, a storage medium 1704, a user interface 1706, a memory device 1708 (e.g., storing schedule-related information 1718), and a processing circuit 1710 (e.g., at least one processor). In various implementations, the user interface 1706 may include one or more of: a keypad, a display, a speaker, a microphone, a touchscreen display, of some other circuitry for receiving an input from or sending an output to a user. The communication interface 1702 may be coupled to one or more antennas 1712, and may include a transmitter 1714 and a receiver 1716. In general, the components of FIG. 17 may be similar to corresponding components of the apparatus 1100 of FIG. 11.

According to one or more aspects of the disclosure, the processing circuit 1710 may be adapted to perform any or all of the features, processes, functions, operations and/or routines for any or all of the apparatuses described herein. For example, the processing circuit 1710 may be configured to perform any of the steps, functions, and/or processes described herein with respect to FIGS. 1-10 and 18-22 in various implementations. As used herein, the term "adapted" in relation to the processing circuit 1710 may refer to the processing circuit 1710 being one or more of configured, employed, implemented, and/or programmed to perform a particular process, function, operation and/or routine according to various features described herein.

The processing circuit 1710 may be a specialized processor, such as an application specific integrated circuit (ASIC) that serves as a means for (e.g., structure for) carrying out any one of the operations described herein in conjunction with FIGS. 1-10 and 18-22 in various implementations. The processing circuit 1710 may serve as one example of a means for transmitting and/or a means for receiving. In various implementations, the processing circuit 1710 may provide the functionality described above for the second device 204 of FIG. 2.

According to at least one example of the apparatus 1700, the processing circuit 1710 may include one or more of a circuit/module for receiving 1720 or a circuit/module for determining 1722. In various implementations, the circuit/module for receiving 1720 or the circuit/module for determining 1722 may provide, at least in part, the functionality described above for the second device 204 of FIG. 2.

As mentioned above, programming stored by the storage medium 1704, when executed by the processing circuit 1710, causes the processing circuit 1710 to perform one or more of the various functions and/or process operations described herein. For example, the programming, when executed by the processing circuit 1710, may cause the processing circuit 1710 to perform the various functions, steps, and/or processes described herein with respect to FIGS. 1-10 and 18-22 in various implementations. As shown in FIG. 17, the storage medium 1704 may include one or more of code for receiving 1724 or code for determining 1726. In various implementations, the code for receiving 1724 or the code for determining 1726 may be executed or otherwise used to provide the functionality described herein for the circuit/module for receiving 1720 or the circuit/module for determining 1722, respectively.

The circuit/module for receiving 1720 may include circuitry and/or programming (e.g., code for receiving 1724 stored on the storage medium 1704) adapted to perform several functions relating to, for example, receiving information.

In some implementations, the circuit/module for receiving 1720 performs the operations that follow. The circuit/module for receiving 1720 obtains information (e.g., from the communication interface 1702, the receiver 1716, the memory device 1708, some other component of the apparatus 1700, or some other device), processes (e.g., decodes) the information, and outputs the information to another component of the apparatus 1700 (e.g., the memory device 1708 or some other component). In some scenarios (e.g., if the circuit/module for receiving 1720 includes a receiver), the circuit/module for receiving 1720 receives information directly from a device that transmitted the information (e.g., via radio frequency signaling or some other type of signaling suitable for the applicable communication medium).

The received information may take different forms in different scenarios. In some aspects, the circuit/module for receiving 1720 may receive information according to a schedule for first traffic. In some aspects, at least a portion of a first set of resource elements scheduled for the first traffic may be protected from additional scheduling. In some aspects, the circuit/module for receiving 1720 may receive information on a first set of resource elements scheduled for control signaling of first traffic. In some aspects, the circuit/module for receiving 1720 may receive additional second traffic that punctures at least one resource element for data of the first traffic.

The circuit/module for receiving 1720 (e.g., a means for receiving) may take various forms. In some implementations, the circuit/module for receiving 1720 may correspond to, for example, an interface (e.g., a bus interface, a send/receive interface, or some other type of signal interface), a communication device, a transceiver, a receiver, or some other similar component as discussed herein. In some implementations, the communication interface 1702 includes the circuit/module for receiving 1720 and/or the code for receiving 1724. In some implementations, the circuit/module for receiving 1720 and/or the code for receiving 1724 is configured to control the communication interface 1702 (e.g., a transceiver or a receiver) to receive the information.

The circuit/module for determining 1722 may include circuitry and/or programming (e.g., code for determining 1726 stored on the storage medium 1704) adapted to perform several functions relating to, for example, determining at least one condition. In some aspects, the circuit/module for determining 1722 (e.g., a means for determining) may correspond to, for example, a processing circuit.

In some aspects, the circuit/module for determining 1722 may determine whether second traffic punctured any resource element for first traffic. To this end, the circuit/module for determining 1722 may obtain information according to a schedule for the first traffic. For example, the circuit/module for determining 1722 may obtain this information from the circuit/module for receiving 1720, the communication interface 1702, the memory device 1708, or some other component of the apparatus 1700. The circuit/module for determining 1722 may then determine whether the second traffic has been or is being scheduled during a resource element schedule for the first traffic. For example, the circuit/module for determining 1722 compare schedules for the first traffic and the second traffic. Next, the circuit/module for determining 1722 outputs an indication of the determination to the circuit/module for communicating 1722, the memory device 1708, or some other component of the apparatus 1700.

In some aspects, the circuit/module for determining 1722 may search for a puncture of at least one resource element for data of the first traffic but not search for a puncture of any resource element for the control signaling of the first traffic (e.g., during a particular TTI).

In some aspects, the circuit/module for determining 1722 may search for a puncture of at least one resource element for control signaling of the first traffic but not search for a puncture of any resource element for the control signaling that is exempt from being punctured (e.g., during a particular TTI).

In some aspects, the circuit/module for determining 1722 may search for a puncture of a first set of resource elements for first control signaling of the first traffic but not search for a puncture of any resource elements that comprise an indication of a second set of resource elements for second control signaling of the first traffic (e.g., during a particular TTI).

In some aspects, the circuit/module for determining 1722 may search for a puncture of resource elements of the TTI except for any resource element of a first set of resource elements for the TTI that comprises an indication that control signaling of the first traffic commences in a second set of resource elements for the TTI.

In some aspects, the circuit/module for determining 1722 may determine whether received information comprises second traffic rather than the first traffic. To this end, the circuit/module for determining 1722 may obtain the first second traffic (e.g., from the circuit/module for receiving 1720, the communication interface 1702, the memory device 1708, or some other component of the apparatus 1700). The circuit/module for determining 1722 may identify a type of the second traffic (e.g., based on type information obtained from the memory device 1708 or some other component). Next, the circuit/module for determining 1722 may compare the type to an expected type (the first traffic type) and output an indication of the comparison to the communication interface 1702, the memory device 1708, or some other component of the apparatus 1700.

Sixth Example Process

Figure 18:
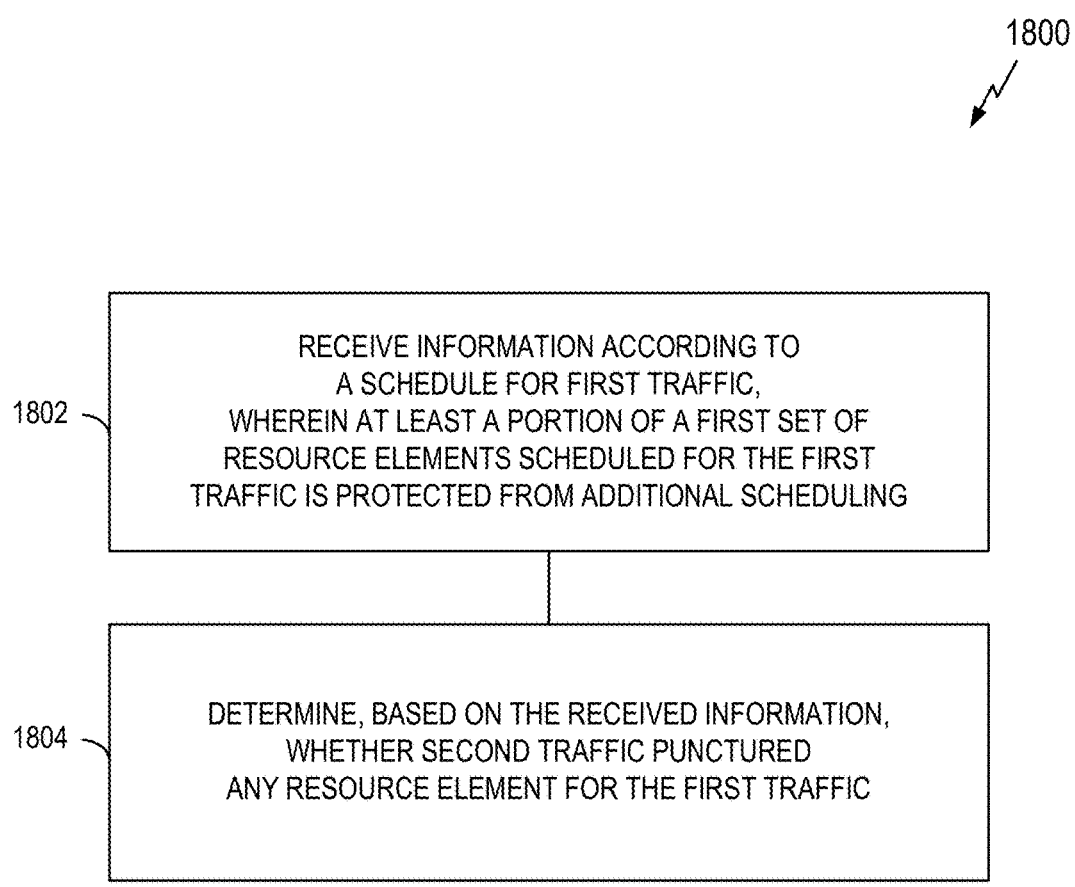
FIG. 18 is a flow diagram illustrating an example of a communication process in accordance with some aspects of the disclosure.

FIG. 18 illustrates a process 1800 for communication in accordance with some aspects of the disclosure. The process 1800 may take place within a processing circuit (e.g., the processing circuit 1710 of FIG. 17), which may be located in a scheduled entity, an access terminal, a base station, or some other suitable apparatus. Of course, in various aspects within the scope of the disclosure, the process 1800 may be implemented by any suitable apparatus capable of supporting communication-related operations.

At block 1802, an apparatus (e.g., a UE) receives information according to a schedule for first traffic. In some aspects, at least a portion of a first set of resource elements scheduled for the first traffic may be protected from additional scheduling. For example, the at least a portion of the first set of resource elements may be exempt from being punctured for a particular transmission (e.g., during a particular TTI).

The at least a portion of the first set of resource elements may take different forms in different scenarios. In some aspects, the at least a portion of the first set of resource elements includes all of the first set of resource elements. In some aspects, the at least a portion of the first set of resource elements includes an indication of a portion of the second set of resource elements for additional control signaling of the first traffic. In some aspects, the at least a portion of the first set of resource elements includes an indication that the control signaling of the first traffic commences in the second set of resource elements.

At block 1804, the apparatus determines, based on the received information, whether second traffic punctured any resource element for the first traffic. In some aspects, the schedule indicates that the second traffic is allowed to puncture at least one second resource element for data of the first traffic. In some aspects, the resource elements may be time and frequency resources.

The determination of block 1804 may take different forms in different scenarios. In some aspects, the determination may include searching for a puncture of at least one resource element for data of the first traffic but not searching for a puncture of any resource element for the control signaling of the first traffic (e.g., for a particular transmission such as during a particular TTI). In some aspects, the determination may include determining whether the second traffic punctured the first set of resource elements. In some aspects, the determination may include determining whether the second traffic punctured a second set of resource elements carrying data for the first traffic.

The first and second traffic may take various forms and may be handled in various ways. In some aspects, the first traffic may be scheduled during transmission time intervals (TTIs) of a first length and the second traffic may be scheduled during TTIs of a second length that is shorter than the first length. In some aspects, the first traffic may be associated with a first latency requirement; and the second traffic may be associated with a second latency requirement that is stricter than the first latency requirement. In some aspects, the first traffic may be associated with a first reliability requirement; and the second traffic may be associated with a second reliability requirement that is stricter than the first reliability requirement. In some aspects, the first traffic may be associated with a first priority; and the second traffic may be associated with a second priority that is stricter than the first priority. In some aspects, the first traffic may be mobile broadband traffic; and the second traffic may be mission critical traffic.

Seventh Example Process

Figure 19:
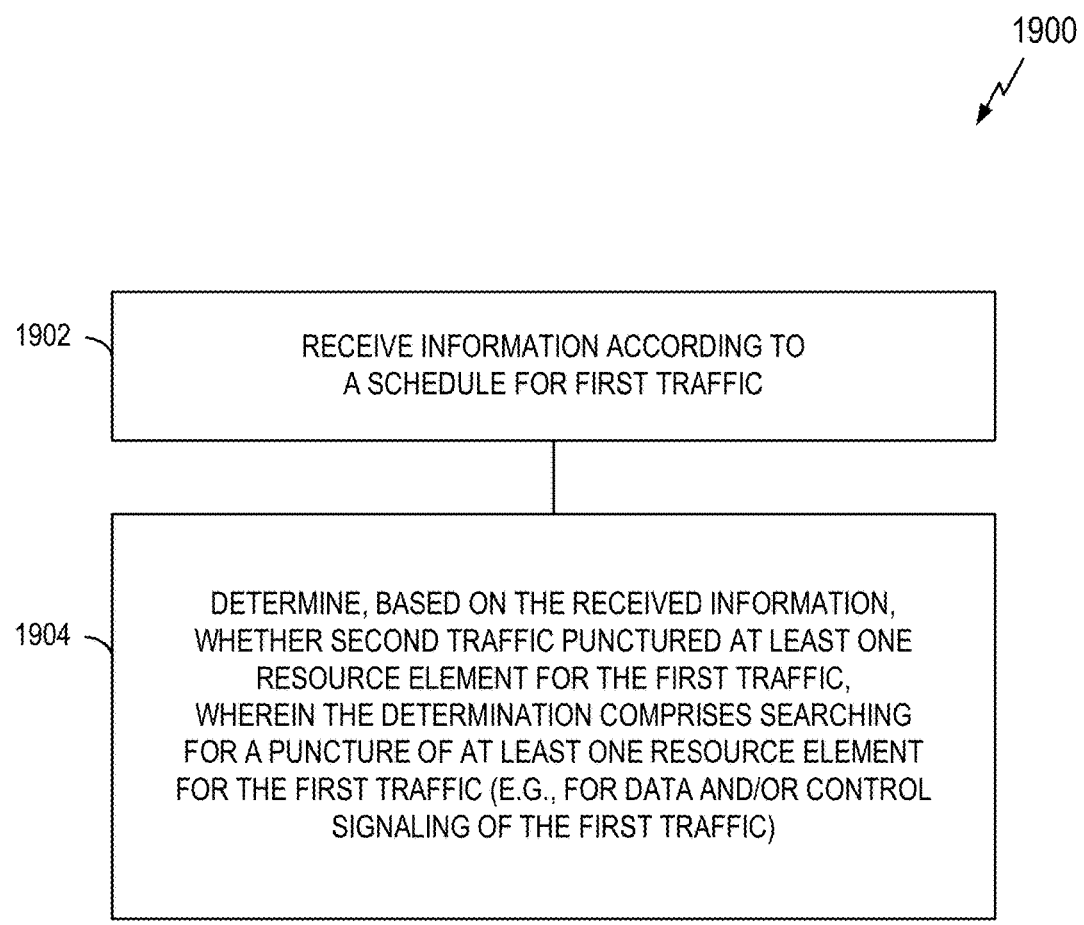
FIG. 19 is a flow diagram illustrating another example of a communication process in accordance with some aspects of the disclosure.

FIG. 19 illustrates a process 1900 for communication in accordance with some aspects of the disclosure. The process 1900 may take place within a processing circuit (e.g., the processing circuit 1710 of FIG. 17), which may be located in a scheduled entity, an access terminal, a base station, or some other suitable apparatus. Of course, in various aspects within the scope of the disclosure, the process 1900 may be implemented by any suitable apparatus capable of supporting communication-related operations.

At block 1902, an apparatus (e.g., a UE) receives information according to a schedule for first traffic. In some aspects, the schedule may indicate that second traffic is allowed to puncture at least one resource element for data of the first traffic.

At block 1904, the apparatus determines, based on the received information, whether second traffic punctured at least one resource element for the first traffic. In some aspects, the at least one resource element may be for data of the first traffic. In some aspects, the at least one resource element may be for control signaling of the first traffic. In some aspects, the determination of block 1904 may include searching for a puncture of at least one resource element for control signaling of the first traffic but not searching for a puncture of any resource element for the first traffic that is exempt from being punctured (e.g., for a particular transmission such as during a particular TTI). In some aspects, the resource elements may be time and frequency resources.

In some aspects, the schedule may involve puncturing at least one but not all of the resource elements for the control signaling of the first traffic (e.g., for a particular transmission such as during a particular TTI). In this case, the portion of the first set of resource elements that is exempt from being punctured may include an indication of a second set of resource elements for second control signaling of the first traffic.

The first and second traffic may take various forms and may be handled in various ways. In some aspects, the first traffic may be scheduled during transmission time intervals (TTIs) of a first length and the second traffic may be scheduled during TTIs of a second length that is shorter than the first length. In some aspects, the first traffic may be associated with a first latency requirement; and the second traffic may be associated with a second latency requirement that is stricter than the first latency requirement. In some aspects, the first traffic may be associated with a first reliability requirement; and the second traffic may be associated with a second reliability requirement that is stricter than the first reliability requirement. In some aspects, the first traffic may be associated with a first priority; and the second traffic may be associated with a second priority that is stricter than the first priority. In some aspects, the first traffic may be mobile broadband traffic; and the second traffic may be mission critical traffic.

Eighth Example Process

Figure 20:
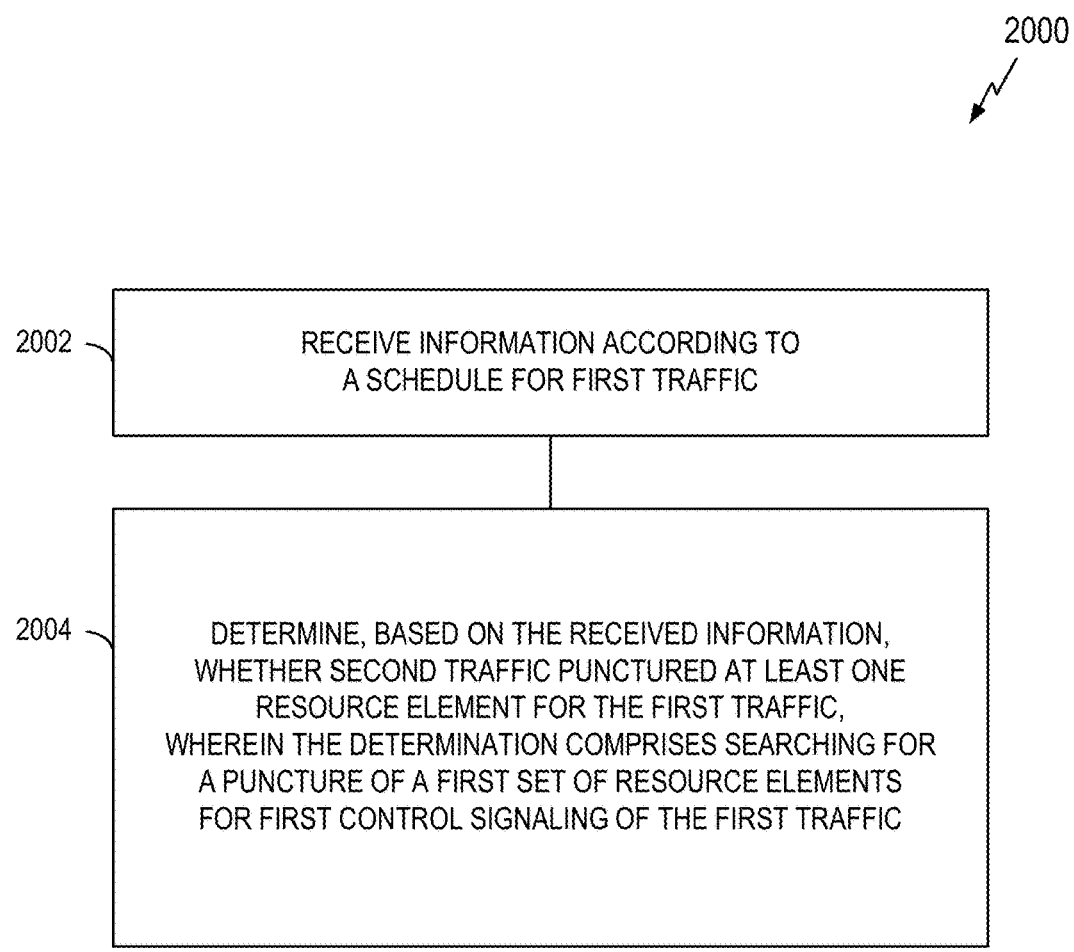
FIG. 20 is a flow diagram illustrating another example of a communication process in accordance with some aspects of the disclosure.

FIG. 20 illustrates a process 2000 for communication in accordance with some aspects of the disclosure. The process 2000 may take place within a processing circuit (e.g., the processing circuit 1710 of FIG. 17), which may be located in a scheduled entity, an access terminal, a base station, or some other suitable apparatus. Of course, in various aspects within the scope of the disclosure, the process 2000 may be implemented by any suitable apparatus capable of supporting communication-related operations.

At block 2002, an apparatus (e.g., a UE) receives information according to a schedule for first traffic. In some aspects, the schedule may indicate that second traffic is allowed to puncture at least one resource element for data of the first traffic.

At block 2004, the apparatus determines, based on the received information, whether second traffic punctured at least one resource element for the first traffic. In some aspects, the determination may include searching for a puncture of a first set of resource elements for first control signaling of the first traffic, but not searching for a puncture of any resource elements that may include an indication of a second set of resource elements for second control signaling of the first traffic (e.g., for a particular transmission such as during a particular TTI). In some aspects, the resource elements may be time and frequency resources.

The first and second traffic may take various forms and may be handled in various ways. In some aspects, the first traffic may be scheduled during transmission time intervals (TTIs) of a first length and the second traffic may be scheduled during TTIs of a second length that is shorter than the first length. In some aspects, the first traffic may be associated with a first latency requirement; and the second traffic may be associated with a second latency requirement that is stricter than the first latency requirement. In some aspects, the first traffic may be associated with a first reliability requirement; and the second traffic may be associated with a second reliability requirement that is stricter than the first reliability requirement. In some aspects, the first traffic may be associated with a first priority; and the second traffic may be associated with a second priority that is stricter than the first priority. In some aspects, the first traffic may be mobile broadband traffic; and the second traffic may be mission critical traffic.

Ninth Example Process

Figure 21:
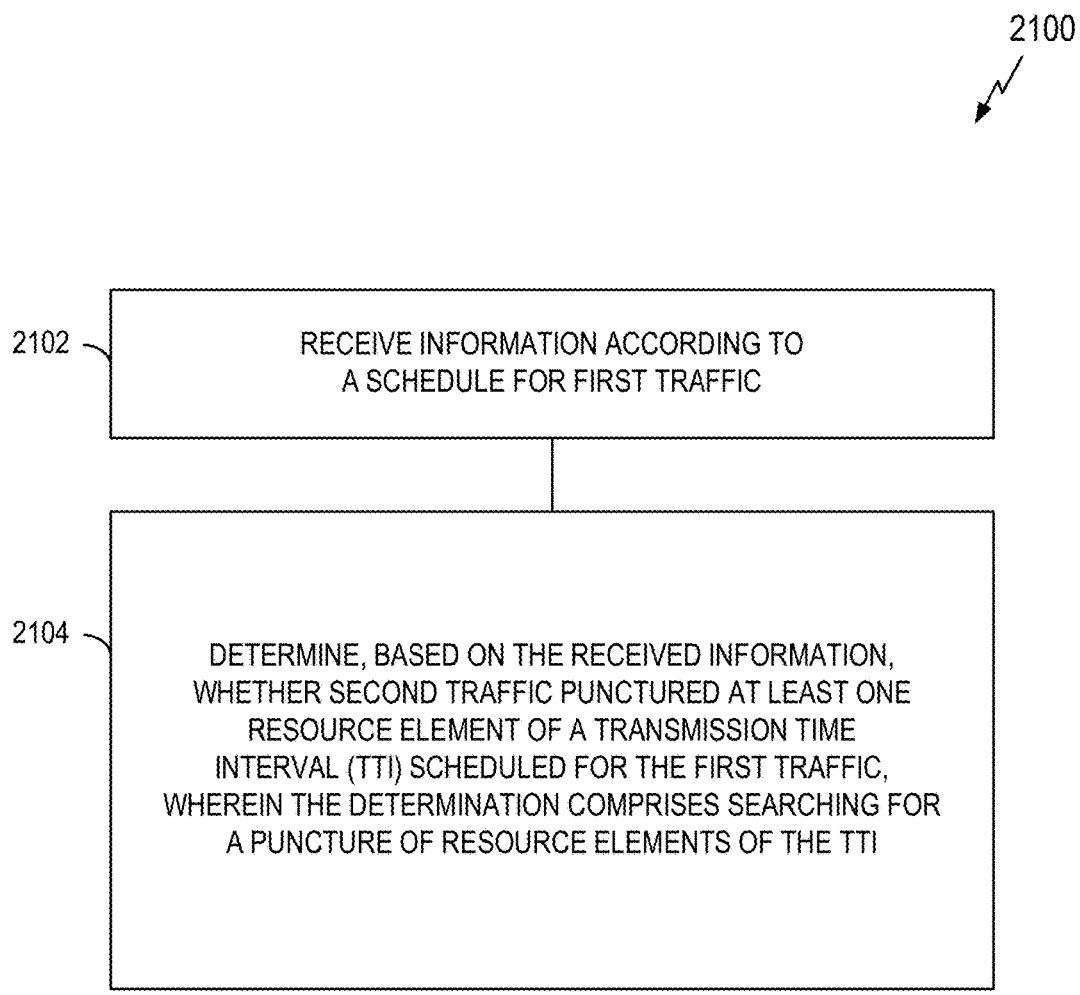
FIG. 21 is a flow diagram illustrating another example of a communication process in accordance with some aspects of the disclosure.

FIG. 21 illustrates a process 2100 for communication in accordance with some aspects of the disclosure. The process 2100 may take place within a processing circuit (e.g., the processing circuit 1710 of FIG. 17), which may be located in a scheduled entity, an access terminal, a base station, or some other suitable apparatus. Of course, in various aspects within the scope of the disclosure, the process 2100 may be implemented by any suitable apparatus capable of supporting communication-related operations.

At block 2102, an apparatus (e.g., a UE) receives information according to a schedule for first traffic. In some aspects, the schedule may indicate that second traffic is allowed to puncture at least one resource element for data of the first traffic.

At block 2104, the apparatus determines, based on the received information, whether second traffic punctured at least one resource element of a transmission time interval (TTI) scheduled for the first traffic. In some aspects, the determination may include searching for a puncture of resource elements of the TTI (e.g., except for any resource element of a first set of resource elements for the TTI that may include an indication that control signaling of the first traffic commences in a second set of resource elements for the TTI). In some aspects, the resource elements may be time and frequency resources.

The first and second traffic may take various forms and may be handled in various ways. In some aspects, the first traffic may be scheduled during transmission time intervals (TTIs) of a first length and the second traffic may be scheduled during TTIs of a second length that is shorter than the first length. In some aspects, the first traffic may be associated with a first latency requirement; and the second traffic may be associated with a second latency requirement that is stricter than the first latency requirement. In some aspects, the first traffic may be associated with a first reliability requirement; and the second traffic may be associated with a second reliability requirement that is stricter than the first reliability requirement. In some aspects, the first traffic may be associated with a first priority; and the second traffic may be associated with a second priority that is stricter than the first priority. In some aspects, the first traffic may be mobile broadband traffic; and the second traffic may be mission critical traffic.

Tenth Example Process

Figure 22:
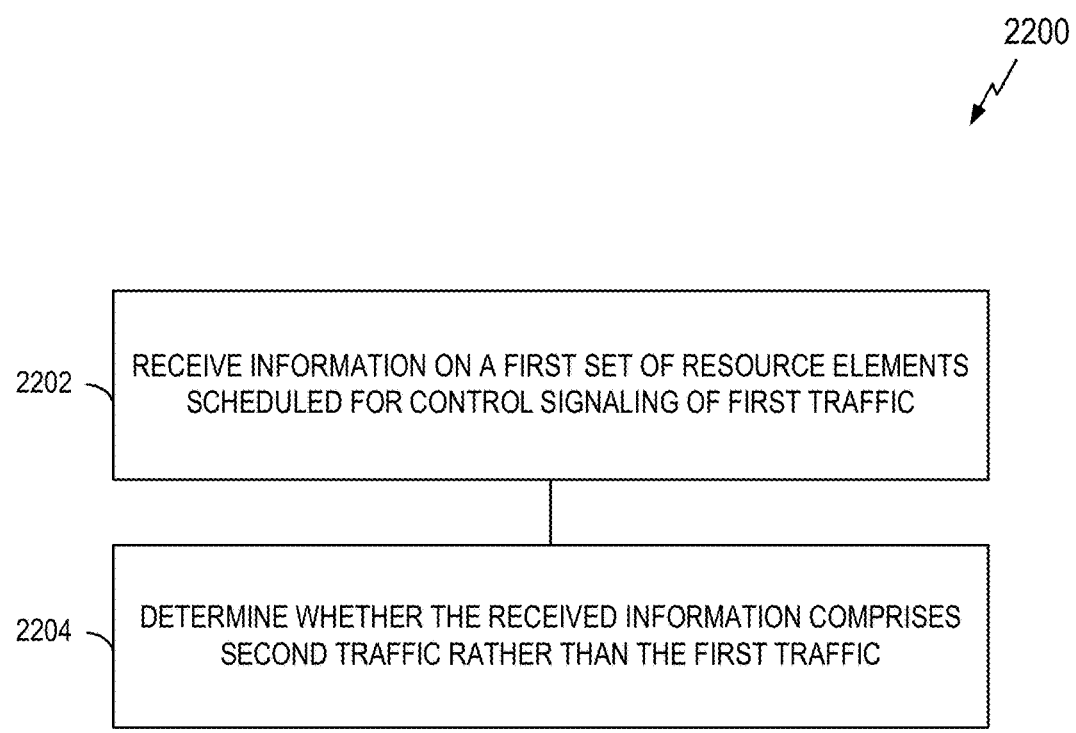
FIG. 22 is a flow diagram illustrating another example of a communication process in accordance with some aspects of the disclosure.

FIG. 22 illustrates a process 2200 for communication in accordance with some aspects of the disclosure. The process 2200 may take place within a processing circuit (e.g., the processing circuit 1710 of FIG. 17), which may be located in a scheduled entity, an access terminal, a base station, or some other suitable apparatus. Of course, in various aspects within the scope of the disclosure, the process 2200 may be implemented by any suitable apparatus capable of supporting communication-related operations.

At block 2202, an apparatus (e.g., a UE) receives information on a first set of resource elements scheduled for control signaling of first traffic. In some aspects, the resource elements may be time and frequency resources.

At block 2204, the apparatus determines whether the received information may include second traffic rather than the first traffic.

In some aspects, the process 2200 may include receiving additional second traffic that punctures at least one resource element for data of the first traffic.

The first and second traffic may take various forms and may be handled in various ways. In some aspects, the first traffic may be scheduled during transmission time intervals (TTIs) of a first length and the second traffic may be scheduled during TTIs of a second length that is shorter than the first length. In some aspects, the first traffic may be associated with a first latency requirement; and the second traffic may be associated with a second latency requirement that is stricter than the first latency requirement. In some aspects, the first traffic may be associated with a first reliability requirement; and the second traffic may be associated with a second reliability requirement that is stricter than the first reliability requirement. In some aspects, the first traffic may be associated with a first priority; and the second traffic may be associated with a second priority that is stricter than the first priority. In some aspects, the first traffic may be mobile broadband traffic; and the second traffic may be mission critical traffic.

Additional Aspects

In one aspect, the disclosure provides an apparatus configured for communication that includes a memory and a processor coupled to the memory. The processor and the memory are configured to: schedule control signaling of first traffic on a first set of resource elements and data of the first traffic on a second set of resource elements, wherein the first set of resource elements is protected from additional scheduling; schedule second traffic on the second set of resource elements; and communicate a schedule indicative of the scheduling of the first traffic and the second traffic.

Another aspect of the disclosure provides a method of communication including: scheduling control signaling of first traffic on a first set of resource elements and data of the first traffic on a second set of resource elements, wherein the first set of resource elements is protected from additional scheduling; scheduling second traffic on the second set of resource elements; and communicating a schedule indicative of the scheduling of the first traffic and the second traffic.

Another aspect of the disclosure provides an apparatus configured for communication. The apparatus including: means for scheduling control signaling of first traffic on a first set of resource elements and data of the first traffic on a second set of resource elements, wherein the first set of resource elements is protected from additional scheduling; means for scheduling second traffic on the second set of resource elements; and means for communicating a schedule indicative of the scheduling of the first traffic and the second traffic.

Another aspect of the disclosure provides a non-transitory computer-readable medium storing computer-executable code, including code to: schedule control signaling of first traffic on a first set of resource elements and data of the first traffic on a second set of resource elements, wherein the first set of resource elements is protected from additional scheduling; schedule second traffic on the second set of resource elements; and communicate a schedule indicative of the scheduling of the first traffic and the second traffic.

In one aspect, the disclosure provides an apparatus configured for communication that includes a memory and a processor coupled to the memory. The processor and the memory are configured to: schedule first control signaling of first traffic on a first set of resource elements, wherein a portion of the first set of resource elements is exempt from being punctured; schedule second traffic on the first set of resource elements; and communicate a schedule indicative of the scheduling of the first traffic and the second traffic.

Another aspect of the disclosure provides a method of communication including: scheduling first control signaling of first traffic on a first set of resource elements, wherein a portion of the first set of resource elements is exempt from being punctured; scheduling second traffic on the first set of resource elements; and communicating a schedule indicative of the scheduling of the first traffic and the second traffic.

Another aspect of the disclosure provides an apparatus configured for communication. The apparatus including: means for scheduling first control signaling of first traffic on a first set of resource elements, wherein a portion of the first set of resource elements is exempt from being punctured; means for scheduling second traffic on the first set of resource elements; and means for communicating a schedule indicative of the scheduling of the first traffic and the second traffic.

Another aspect of the disclosure provides a non-transitory computer-readable medium storing computer-executable code, including code to: schedule first control signaling of first traffic on a first set of resource elements, wherein a portion of the first set of resource elements is exempt from being punctured; schedule second traffic on the first set of resource elements; and communicate a schedule indicative of the scheduling of the first traffic and the second traffic.

In one aspect, the disclosure provides an apparatus configured for communication that includes a memory and a processor coupled to the memory. The processor and the memory are configured to: schedule first control signaling of first traffic on a first set of resource elements, wherein a portion of the first set of resource elements may include an indication of a second set of resource elements for second control signaling of the first traffic, and wherein the portion is protected from additional scheduling; schedule second traffic on the first set of resource elements; and communicate a schedule indicative of the scheduling of the first traffic and the second traffic.

Another aspect of the disclosure provides a method of communication including: scheduling first control signaling of first traffic on a first set of resource elements, wherein a portion of the first set of resource elements may include an indication of a second set of resource elements for second control signaling of the first traffic, and wherein the portion is protected from additional scheduling; scheduling second traffic on the first set of resource elements; and communicating a schedule indicative of the scheduling of the first traffic and the second traffic.

Another aspect of the disclosure provides an apparatus configured for communication. The apparatus including: means for scheduling first control signaling of first traffic on a first set of resource elements, wherein a portion of the first set of resource elements may include an indication of a second set of resource elements for second control signaling of the first traffic, and wherein the portion is protected from additional scheduling; means for scheduling second traffic on the first set of resource elements; and means for communicating a schedule indicative of the scheduling of the first traffic and the second traffic.

Another aspect of the disclosure provides a non-transitory computer-readable medium storing computer-executable code, including code to: schedule first control signaling of first traffic on a first set of resource elements, wherein a portion of the first set of resource elements may include an indication of a second set of resource elements for second control signaling of the first traffic, and wherein the portion is protected from additional scheduling; schedule second traffic on the first set of resource elements; and communicate a schedule indicative of the scheduling of the first traffic and the second traffic.

In one aspect, the disclosure provides an apparatus configured for communication that includes a memory and a processor coupled to the memory. The processor and the memory are configured to: schedule first traffic on a transmission time interval (TTI) associated with a first set of resource elements and a second set of resource elements, wherein a portion of the first set of resource elements may include an indication that control signaling of the first traffic commences in the second set of resource elements, and wherein the portion is protected from additional scheduling; schedule second traffic on the TTI; and communicate a schedule indicative of the scheduling of the first traffic and the second traffic.

Another aspect of the disclosure provides a method of communication including: scheduling first traffic on a transmission time interval (TTI) associated with a first set of resource elements and a second set of resource elements, wherein a portion of the first set of resource elements may include an indication that control signaling of the first traffic commences in the second set of resource elements, and wherein the portion is protected from additional scheduling; scheduling second traffic on the TTI; and communicating a schedule indicative of the scheduling of the first traffic and the second traffic.

Another aspect of the disclosure provides an apparatus configured for communication. The apparatus including: means for scheduling first traffic on a transmission time interval (TTI) associated with a first set of resource elements and a second set of resource elements, wherein a portion of the first set of resource elements may include an indication that control signaling of the first traffic commences in the second set of resource elements, and wherein the portion is protected from additional scheduling; means for scheduling second traffic on the TTI; and means for communicating a schedule indicative of the scheduling of the first traffic and the second traffic.

Another aspect of the disclosure provides a non-transitory computer-readable medium storing computer-executable code, including code to: schedule first traffic on a transmission time interval (TTI) associated with a first set of resource elements and a second set of resource elements, wherein a portion of the first set of resource elements may include an indication that control signaling of the first traffic commences in the second set of resource elements, and wherein the portion is protected from additional scheduling; schedule second traffic on the TTI; and communicate a schedule indicative of the scheduling of the first traffic and the second traffic.

In one aspect, the disclosure provides an apparatus configured for communication that includes a memory and a processor coupled to the memory. The processor and the memory are configured to: determine that the second traffic has priority over the first traffic; and communicate the second traffic on a first set of resource elements scheduled for control signaling of first traffic, wherein the transmission is invoked as a result of the determination.

Another aspect of the disclosure provides a method of communication including: determining that the second traffic has priority over the first traffic; and communicating the second traffic on a first set of resource elements scheduled for control signaling of first traffic, wherein the transmission is invoked as a result of the determination.

Another aspect of the disclosure provides an apparatus configured for communication. The apparatus including: means for determining that the second traffic has priority over the first traffic; and means for communicating the second traffic on a first set of resource elements scheduled for control signaling of first traffic, wherein the transmission is invoked as a result of the determination.

Another aspect of the disclosure provides a non-transitory computer-readable medium storing computer-executable code, including code to: determine that the second traffic has priority over the first traffic; and communicate the second traffic on a first set of resource elements scheduled for control signaling of first traffic, wherein the transmission is invoked as a result of the determination.

In one aspect, the disclosure provides an apparatus configured for communication that includes a memory and a processor coupled to the memory. The processor and the memory are configured to: receive information according to a schedule for first traffic; and determine, based on the received information, whether second traffic punctured at least one resource element for the first traffic, wherein the determination may include searching for a puncture of at least one resource element for data of the first traffic.

Another aspect of the disclosure provides a method of communication including: receiving information according to a schedule for first traffic; and determining, based on the received information, whether second traffic punctured at least one resource element for the first traffic, wherein the determination may include searching for a puncture of at least one resource element for data of the first traffic.

Another aspect of the disclosure provides an apparatus configured for communication. The apparatus including: means for receiving information according to a schedule for first traffic; and means for determining, based on the received information, whether second traffic punctured at least one resource element for the first traffic, wherein the determination may include searching for a puncture of at least one resource element for data of the first traffic.

Another aspect of the disclosure provides a non-transitory computer-readable medium storing computer-executable code, including code to: receive information according to a schedule for first traffic; and determine, based on the received information, whether second traffic punctured at least one resource element for the first traffic, wherein the determination may include searching for a puncture of at least one resource element for data of the first traffic.

In one aspect, the disclosure provides an apparatus configured for communication that includes a memory and a processor coupled to the memory. The processor and the memory are configured to: receive information according to a schedule for first traffic; and determine, based on the received information, whether second traffic punctured at least one resource element for the first traffic, wherein the determination may include searching for a puncture of at least one resource element for control signaling of the first traffic.

Another aspect of the disclosure provides a method of communication including: receiving information according to a schedule for first traffic; and determining, based on the received information, whether second traffic punctured at least one resource element for the first traffic, wherein the determination may include searching for a puncture of at least one resource element for control signaling of the first traffic.

Another aspect of the disclosure provides an apparatus configured for communication. The apparatus including: means for receiving information according to a schedule for first traffic; and means for determining, based on the received information, whether second traffic punctured at least one resource element for the first traffic, wherein the determination may include searching for a puncture of at least one resource element for control signaling of the first traffic.

Another aspect of the disclosure provides a non-transitory computer-readable medium storing computer-executable code, including code to: receive information according to a schedule for first traffic; and determine, based on the received information, whether second traffic punctured at least one resource element for the first traffic, wherein the determination may include searching for a puncture of at least one resource element for control signaling of the first traffic.

In one aspect, the disclosure provides an apparatus configured for communication that includes a memory and a processor coupled to the memory. The processor and the memory are configured to: receive information according to a schedule for first traffic; and determine, based on the received information, whether second traffic punctured at least one resource element for the first traffic, wherein the determination may include searching for a puncture of a first set of resource elements for first control signaling of the first traffic.

Another aspect of the disclosure provides a method of communication including: receiving information according to a schedule for first traffic; and determining, based on the received information, whether second traffic punctured at least one resource element for the first traffic, wherein the determination may include searching for a puncture of a first set of resource elements for first control signaling of the first traffic.

Another aspect of the disclosure provides an apparatus configured for communication. The apparatus including: means for receiving information according to a schedule for first traffic; and means for determining, based on the received information, whether second traffic punctured at least one resource element for the first traffic, wherein the determination may include searching for a puncture of a first set of resource elements for first control signaling of the first traffic.

Another aspect of the disclosure provides a non-transitory computer-readable medium storing computer-executable code, including code to: receive information according to a schedule for first traffic; and determine, based on the received information, whether second traffic punctured at least one resource element for the first traffic, wherein the determination may include searching for a puncture of a first set of resource elements for first control signaling of the first traffic.

In one aspect, the disclosure provides an apparatus configured for communication that includes a memory and a processor coupled to the memory. The processor and the memory are configured to: receive information according to a schedule for first traffic; and determine, based on the received information, whether second traffic punctured at least one resource element of a transmission time interval (TTI) schedule for the first traffic, wherein the determination may include searching for a puncture of resource elements of the TTI.

Another aspect of the disclosure provides a method of communication including: receiving information according to a schedule for first traffic; and determining, based on the received information, whether second traffic punctured at least one resource element of a transmission time interval (TTI) schedule for the first traffic, wherein the determination may include searching for a puncture of resource elements of the TTI.

Another aspect of the disclosure provides an apparatus configured for communication. The apparatus including: means for receiving information according to a schedule for first traffic; and means for determining, based on the received information, whether second traffic punctured at least one resource element of a transmission time interval (TTI) schedule for the first traffic, wherein the determination may include searching for a puncture of resource elements of the TTI.

Another aspect of the disclosure provides a non-transitory computer-readable medium storing computer-executable code, including code to: receive information according to a schedule for first traffic; and determine, based on the received information, whether second traffic punctured at least one resource element of a transmission time interval (TTI) schedule for the first traffic, wherein the determination may include searching for a puncture of resource elements of the TTI.

In one aspect, the disclosure provides an apparatus configured for communication that includes a memory and a processor coupled to the memory. The processor and the memory are configured to: receive information on a first set of resource elements scheduled for control signaling of first traffic; and determine whether the received information may include second traffic rather than the first traffic.

Another aspect of the disclosure provides a method of communication including: receiving information on a first set of resource elements scheduled for control signaling of first traffic; and determining whether the received information may include second traffic rather than the first traffic.

Another aspect of the disclosure provides an apparatus configured for communication. The apparatus including: means for receiving information on a first set of resource elements scheduled for control signaling of first traffic; and means for determining whether the received information may include second traffic rather than the first traffic.

Another aspect of the disclosure provides a non-transitory computer-readable medium storing computer-executable code, including code to: receive information on a first set of resource elements scheduled for control signaling of first traffic; and determine whether the received information may include second traffic rather than the first traffic.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects.

Likewise, the term "aspect" does not require that all aspects include the discussed feature, advantage or mode of operation. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may include at least one element of a claim.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements."

For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication for an apparatus, comprising:
   scheduling control signaling of first traffic on a first set of resource elements and data of the first traffic on a second set of resource elements, such that a portion of the first set of resource elements is protected from additional scheduling and comprises an indication of a portion of the second set of resource elements for additional control signaling of the first traffic;
   scheduling second traffic on the second set of resource elements;
   communicating, to another apparatus, a schedule indicative of the scheduling of the control signaling and the data of the first traffic and the scheduling of the second traffic; and
   communicating with the other apparatus according to the schedule.

2. The method of claim 1, wherein the scheduling of the second traffic comprises puncturing at least one resource element for data of the first traffic on the second set of resource elements.

3. The method of claim 1, further comprising:
   scheduling additional second traffic on the first set of resource elements.

4. The method of claim 3, wherein the scheduling of the additional second traffic comprises puncturing at least one but not all of the first set of resource elements for the control signaling of the first traffic.

5. The method of claim 1, wherein:
   the first traffic is scheduled during transmission time intervals (TTIs) of a first length; and
   the second traffic is scheduled during TTIs of a second length that is shorter than the first length.

6. The method of claim 1, wherein:
   the first traffic is associated with a first latency requirement; and
   the second traffic is associated with a second latency requirement that is stricter than the first latency requirement.

7. The method of claim 1, wherein:
   the first traffic is associated with a first reliability requirement; and
   the second traffic is associated with a second reliability requirement that is stricter than the first reliability requirement.

8. The method of claim 1, wherein:
   the first traffic is associated with a first priority; and
   the second traffic is associated with a second priority that is stricter than the first priority.

9. The method of claim 1, wherein:
   the first traffic is mobile broadband traffic; and
   the second traffic is mission critical traffic.

10. The method of claim 1, wherein the resource elements are time and frequency resources.

11. An apparatus for communication, comprising:
    a memory; and
    a processor coupled to the memory,
    the processor and the memory configured to:
       schedule control signaling of first traffic on a first set of resource elements and data of the first traffic on a second set of resource elements, such that a portion of the first set of resource elements is protected from additional scheduling and comprises an indication of a portion of the second set of resource elements for additional control signaling of the first traffic;

schedule second traffic on the second set of resource elements;

communicate, to another apparatus, a schedule indicative of the scheduling of the control signaling and the data of the first traffic and the scheduling of the second traffic; and communicate with the other apparatus according to the schedule.

12. The apparatus of claim 11, wherein the scheduling of the second traffic comprises puncturing at least one resource element for data of the first traffic on the second set of resource elements.

13. The apparatus of claim 11, wherein the processor and the memory are further configured to:

schedule additional second traffic on the first set of resource elements.

14. A method of communication for an apparatus, comprising:

receiving a schedule from another apparatus, wherein the schedule indicates scheduling of control signaling of first traffic on a first set of resource elements and scheduling of data of the first traffic on a second set of resource elements, such that a portion of the first set of resource elements is protected from additional scheduling and comprises an indication of a portion of the second set of resource elements for additional control signaling of the first traffic;

receiving information according to the schedule;

determining, based on the received information, whether the second traffic punctured any resource element for the first traffic; and processing the first traffic based on the determination.

15. The method of claim 14, wherein the determination of whether the second traffic punctured any resource element for the first traffic comprises determining whether the second traffic punctured the first set of resource elements.

16. The method of claim 14, wherein the determination of whether the second traffic punctured any resource element for the first traffic comprises determining whether the second traffic punctured a second set of resource elements carrying data for the first traffic.

17. The method of claim 14, wherein the schedule indicates that the second traffic is allowed to puncture at least one second resource element for data of the first traffic.

18. The method of claim 14, wherein:
the first traffic is scheduled during transmission time intervals (TTIs) of a first length; and
the second traffic is scheduled during TTIs of a second length that is shorter than the first length.

19. The method of claim 14, wherein:
the first traffic is associated with a first latency requirement; and
the second traffic is associated with a second latency requirement that is stricter than the first latency requirement.

20. The method of claim 14, wherein:
the first traffic is associated with a first reliability requirement; and
the second traffic is associated with a second reliability requirement that is stricter than the first reliability requirement.

21. The method of claim 14, wherein:
the first traffic is associated with a first priority; and
the second traffic is associated with a second priority that is stricter than the first priority.

22. An apparatus for communication, comprising:
a memory; and
a processor coupled to the memory,
the processor and the memory configured to:
receive a schedule from another apparatus, wherein the schedule indicates scheduling of control signaling of first traffic on a first set of resource elements and scheduling of data of the first traffic on a second set of resource elements, such that a portion of the first set of resource elements is protected from additional scheduling and comprises an indication of a portion of the second set of resource elements for additional control signaling of the first traffic;
receive information according to the schedule;
determine, based on the received information, whether the second traffic punctured at least one second resource element for the first traffic; and
process the first traffic based on the determination.

* * * * *